US009220114B2

(12) United States Patent
Liu

(10) Patent No.: US 9,220,114 B2
(45) Date of Patent: Dec. 22, 2015

(54) METHOD AND APPARATUS FOR RESTRICTING CHANNEL ACCESS TO A WIRELESS STATION OPERATING IN ACCORDANCE WITH A POWER SAVING SCHEME

(71) Applicant: Marvell World Trade Ltd., St. Michael (BB)

(72) Inventor: Yong Liu, Campbell, CA (US)

(73) Assignee: Marvell World Trade Ltd., St. Michael (BB)

( * ) Notice: Subject to any disclaimer, the term of this patent is extended or adjusted under 35 U.S.C. 154(b) by 181 days.

(21) Appl. No.: 13/911,267

(22) Filed: Jun. 6, 2013

(65) Prior Publication Data

US 2013/0329658 A1    Dec. 12, 2013

Related U.S. Application Data

(60) Provisional application No. 61/794,292, filed on Mar. 15, 2013, provisional application No. 61/694,649, filed on Aug. 29, 2012, provisional application No. 61/683,428, filed on Aug. 15, 2012, provisional application No. 61/669,591, filed on Jul. 9, 2012, provisional application No. 61/657,581, filed on Jun. 8, 2012.

(51) Int. Cl.
*H04W 4/00* (2009.01)
*H04W 74/04* (2009.01)
(Continued)

(52) U.S. Cl.
CPC .............. *H04W 74/04* (2013.01); *H04W 74/02* (2013.01); *H04W 74/0816* (2013.01); *Y02B 60/50* (2013.01)

(58) Field of Classification Search
None
See application file for complete search history.

(56) References Cited

U.S. PATENT DOCUMENTS 7,664,089 B2   2/2010   Zhao
7,710,930 B2   5/2010   Kwak
8,036,241 B2   10/2011  Ji et al.
(Continued)

FOREIGN PATENT DOCUMENTS

EP   1513295 A2   3/2005
EP   1553730 A1   7/2005
(Continued)

OTHER PUBLICATIONS

Zhao, Liqiang et al.; Hybrid DCF Supporting Hybrid Antennas in a WLAN; IMACS Multiconference; Oct. 4-6, 2006.
(Continued)

*Primary Examiner* — Wanda Z Russell
*Assistant Examiner* — Jeff Banthrongsack

(57) ABSTRACT

A wireless station includes a transceiver configured to wirelessly receive networking frames over a wireless medium, and a channel access counter configured to track a time period and signal that the time period has expired. The time period begins in response to a first networking frame of the networking frames. The first networking frame is addressed to a receiver other than the wireless station. A length of the time period is based on a first length in response to a type of the first networking frame being an acknowledgment frame type. The length of the time period is based on a second length in response to the type of the first networking frame being a data frame type. The transceiver is configured to wait to access the wireless medium until after the channel access counter signals that the time period has expired.

20 Claims, 23 Drawing Sheets

(51) Int. Cl.
   *H04W 74/02* (2009.01)
   *H04W 74/08* (2009.01)

(56) References Cited

U.S. PATENT DOCUMENTS

| | | | |
|---|---|---|---|
| 8,045,574 | B2 | 10/2011 | Sherman et al. |
| 8,121,108 | B2 | 2/2012 | Kwon et al. |
| 8,265,061 | B1 | 9/2012 | Smith et al. |
| 8,355,389 | B2 | 1/2013 | Kasslin et al. |
| 8,411,699 | B2 | 4/2013 | Ohmi |
| 8,468,615 | B2 | 6/2013 | Tremp |
| 2003/0012163 | A1 | 1/2003 | Cafarelli et al. |
| 2004/0203979 | A1 | 10/2004 | Attar et al. |
| 2004/0218555 | A1 | 11/2004 | Chen et al. |
| 2005/0047386 | A1 | 3/2005 | Yi |
| 2005/0105504 | A1* | 5/2005 | Sakoda ............... 370/349 |
| 2006/0187964 | A1 | 8/2006 | Li et al. |
| 2007/0025244 | A1 | 2/2007 | Ayyagari et al. |
| 2007/0041353 | A1 | 2/2007 | Li et al. |
| 2007/0076675 | A1 | 4/2007 | Chen |
| 2007/0160021 | A1* | 7/2007 | Xhafa et al. ........... 370/338 |
| 2007/0217378 | A1 | 9/2007 | Moorti et al. |
| 2007/0280246 | A1 | 12/2007 | Berkman et al. |
| 2007/0286222 | A1 | 12/2007 | Balasubramanian |
| 2008/0144558 | A1 | 6/2008 | Wentink |
| 2008/0146253 | A1 | 6/2008 | Wentink |
| 2008/0151814 | A1 | 6/2008 | Jokela |
| 2008/0240049 | A1 | 10/2008 | Gaur |
| 2008/0247376 | A1 | 10/2008 | Del Prado Pavon et al. |
| 2008/0310391 | A1 | 12/2008 | Schneidman et al. |
| 2009/0010191 | A1 | 1/2009 | Wentink |
| 2009/0016306 | A1 | 1/2009 | Wang et al. |
| 2009/0109887 | A1 | 4/2009 | Chandra et al. |
| 2009/0196163 | A1 | 8/2009 | Du |
| 2009/0196212 | A1 | 8/2009 | Wentink |
| 2010/0165973 | A1 | 7/2010 | Su et al. |
| 2010/0192001 | A1 | 7/2010 | Cornwall et al. |
| 2010/0278088 | A1 | 11/2010 | Goldman |
| 2010/0309831 | A1 | 12/2010 | Yeh et al. |
| 2010/0315999 | A1 | 12/2010 | Kakani et al. |
| 2011/0026446 | A1 | 2/2011 | Stacey |
| 2011/0122780 | A1* | 5/2011 | Nieminen et al. ........ 370/252 |
| 2011/0176521 | A1 | 7/2011 | Park et al. |
| 2011/0268054 | A1 | 11/2011 | Abraham et al. |
| 2012/0106418 | A1 | 5/2012 | Xhafa et al. |
| 2012/0120858 | A1 | 5/2012 | Das et al. |
| 2012/0147800 | A1 | 6/2012 | Park et al. |
| 2012/0159001 | A1 | 6/2012 | Liu et al. |
| 2012/0219099 | A1 | 8/2012 | Loukianov |
| 2012/0263094 | A1 | 10/2012 | Wentink |
| 2012/0302184 | A1 | 11/2012 | Zaitsu |
| 2012/0315943 | A1 | 12/2012 | Chu et al. |
| 2013/0176902 | A1 | 7/2013 | Wentink et al. |
| 2013/0258931 | A1 | 10/2013 | Gonikberg et al. |
| 2014/0119268 | A1 | 5/2014 | Chu et al. |
| 2014/0153463 | A1 | 6/2014 | Park et al. |

FOREIGN PATENT DOCUMENTS

| | | |
|---|---|---|
| WO | WO-2008111496 A2 | 9/2008 |
| WO | WO-2012122119 | 9/2012 |

OTHER PUBLICATIONS

ANSI/IEEE Std 802.11, 1999 Edition; Information technology—Telecommunications and information exchange between systems—Local and metropolitan area network—Specific requirements—Part 11: Wireless LAN Medium Access Control (MAC) and Physical Layer (PHY) Specifications; LAN/MAN Standards Committee of the IEEE Computer Society; Aug. 20, 1999.

PCT Internation Search Report and Written Opinon for related Application No. PCT/US2012/066246; Jan. 23, 2013; 5 pages.

Park, Miuyoung; IEEE P802.11; Jul. 2012; 32 pages.

Ghosh, Chittabrata et al.; Restricted Access Window Signaling for Uplink Channel Access; Jul. 16, 2012; 13 pages.

Liu, Siyang et al.; DCF Enhancements for Large Number of STAs; Sep. 15, 2011; 11 pages.

Revolution Wi-Fi The Wireless Professional's Connection for Independent Analysis; Wireless QoS Part 1—Background Information; Jul. 28, 2010; 11 pages.

Mangold, Stefan et al.; IEEE 802.11e Wireless LAN for Quality of Service; 2002; 8 pages.

Multi-Rate Layered Decoder Architecture for Block LDPC Codes of the IEEE 802.11n Wireless Standard; Kiran Gunnam, Gwan Choi, Weihuang Wang, and Mark Yeary; © 2007 IEEE. (4 pages).

IEEE Standard for Information technology—Telecommunications and information exchange between systems Local and metropolitan area networks—Specific requirements Part 11: Wireless LAN Medium Access Control (MAC) and Physical Layer (PHY) Specifications; Copyright © 2012 by The Institute of Electrical and Electronics Engineers, Inc.; Mar. 29, 2012; 2,793 pages.

de Vegt, Rolf; Potential Compromise for 802.11ah Use Case Document; IEEE 802.11-11/0457r0; Mar. 2011; 27 pages.

IEEE P802.11ac/D2.0 Draft Standard for Information Technology Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz, Jan. 2012, 359 pages.

IEEE Std 802.11a-1999 (Supplement to IEEE Std 802.11-999) "Supplement to IEEE Standard for Information technology—Telecommunications and information exchange between systems—Local and metropolitan area networks—Specific requirements—Part11: Wireless LAN Medium Access Control (MAC) and Physical Layer (PHY) specifications: Hiqh-Speed Physical Laver in the 5 GHZ Band," *The Institute of Electrical and Electronics Engineers, Inc.*, (1999).

IEEE Std 802.11b-1999/Cor Jan. 2001 (Corrigendum to IEEE Std 802.11 b-1999) "IEEE Standard for Information technology—Telecommunications and information exchange between systems—Local and metropolitan area networks—Specific requirements, Part11: Wireless LAN Medium Access Control (MAC) and Physical Layer (PHY) specifications, Amendment 2: Higher-speed Physical Layer (PHY) extension in the 2.4 GHz band—Corrigendum 1 ," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

International Standard, ISO/IEG 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

IEEE Std 802. 11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

IEEE Std. 802.11n "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

International Search Report and Written Opinion in International Application No. PCT/US2012/034091 dated Nov. 27, 2012

(56) References Cited

OTHER PUBLICATIONS

Low Power Capability Support for 802.11ah dated Jan. 17, 2011.
U.S. Appl. No. 61/475,776 dated Apr. 15, 2011.
PCT International Search Report for related Application No. PCT/US2013/044473; Oct. 29, 2013; 5 pages.
International Preliminary Report on Patentability in Int'l App. No. PCT/US2012/034091, mailed Oct. 31, 2013.
Chen, "Home Network Basis: Transmission Environments and Wired/Wireless Protocols," Prentice Hall (Jul. 2003).
Hiertz, et al., "The IEEE 802.11 Universe," IEEE Communications Magazine, pp. 62-70, Jan. 2010.
Stacey et al., "IEEE P802.11, Wireless LANs, Proposed TGac Draft Amendment," Institute of Electrical and Electronics Engineers, doc. No. IEEE 802.11-10/1361 r3 (Jan. 2011).
Stacey et al., "Specification Framework for TGac," document No. IEEE 802.11-09/0992r20, Institute for Electrical and Electronics Engineers, pp. 1-49, Jan. 18, 2011.
IEEE Std 802.11 ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Mar. 2012.
Perahia, et al., "Gigabit Wireless LANs: an overview of IEEE 802.11 ac and 80211 ad," ACM SIGMOBILE Mobile Computing and Communications Review, vo. 15, No. 3, pp. 23-33, Jul. 2011.
IEEE Std 802.11 of/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," The Institute of Electrical and Electronics Engineers, Inc., Nov. 2011.
Yu, et al. "Coverage extension for IEEE802.11 ah," The Institute of Electrical and Electronics Engineers, doc. No. IEEE 802.11-11/0035r1, (Jan. 2011).
Taghavi et al., "Introductory Submission for TGah", doc. No. IEEE 802.11-11/0062r0, Institute for Electrical and Electronics Engineers, pp. 1-5 (Jan. 14, 2011).
Zhang et al., "11 ah Data Transmission Flow," The Institute of Electrical and Electronics Engineers, doc. No. IEEE 802.11-11/1484r1, (Nov. 2011).
Vermani, et al. "Preamble Format for 1 MHz," The Institute of Electrical and Electronics Engineers, doc. No. IEEE 802.11-11/1482r2, (Nov. 2011).
Zhang et al., "1MHz Waveform in Wider BW ", The Institute of Electrical and Electronics Engineers, doc. No. IEEE 802.11-12/0309r1, (Mar. 2012).
Vermani, et al. "Spec Framework Text for PHY Numerology," The Institute of Electrical and Electronics Engineers, doc. No. IEEE 802.11-11/1311 r0, (Sep. 2011).
Park, Minyoung. "IEEE P802.11 Wireless LANs Proposed Specification Framework for TGah." TGac Spec Framework. 13 pages. Mar. 12, 2012.

* cited by examiner

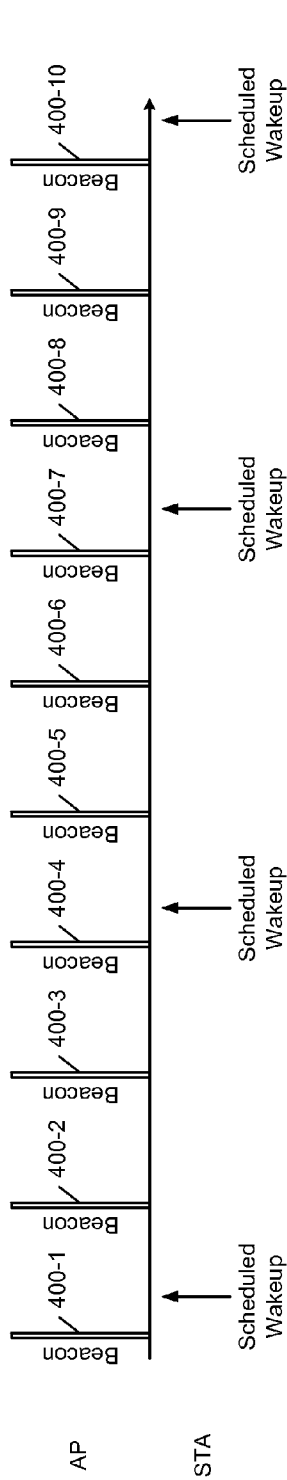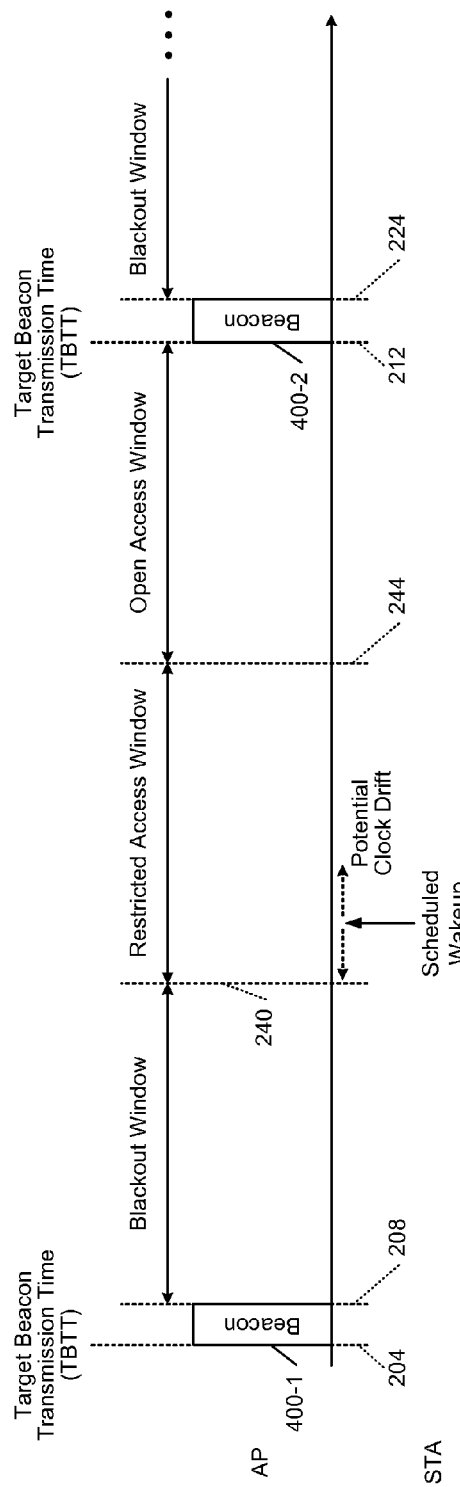

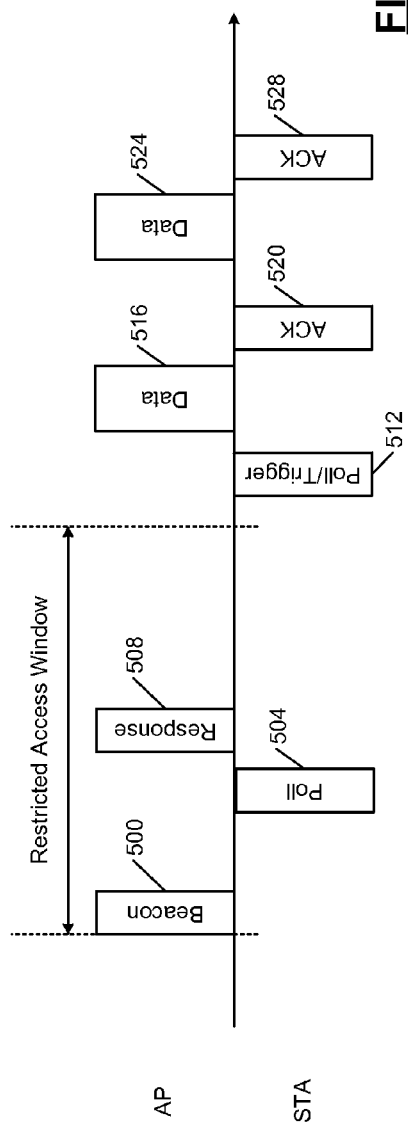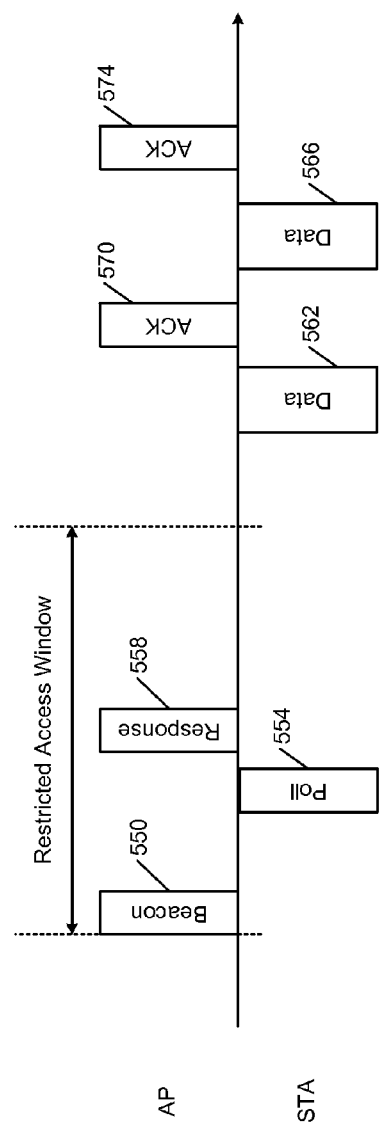

FIG. 11B

| FC | AID | BSSID | FEC |
|---|---|---|---|
| 2 | 2 | 6 | 4 |

Octets

FIG. 11C

| FC | AID | BSSID | BSS Change SN | Timestamp | Other | FEC |
|---|---|---|---|---|---|---|
| 2 | 2 | 6 | 1 | 4 | variable | 4 |

Octets

FIG. 11D

| FC | Duration | RA | BSSID (TA) | FCS |
|---|---|---|---|---|
| 2 | 2 | 6 | 6 | 4 |

Octets

FIG. 11A

| Field | Bit width |
|---|---|
| Message type indicator | 4 |
| TA | 9 |
| RA | 9 |
| Preferred MCS | 4 |
| Tail bits | 6 |
| CRC | 4 |
| Total | 36 |

METHOD AND APPARATUS FOR RESTRICTING CHANNEL ACCESS TO A WIRELESS STATION OPERATING IN ACCORDANCE WITH A POWER SAVING SCHEME

CROSS-REFERENCE TO RELATED APPLICATIONS

This application claims the benefit of U.S. Provisional Application No. 61/657,581, filed on Jun. 8, 2012, U.S. Provisional Application No. 61/669,591, filed on Jul. 9, 2012, U.S. Provisional Application No. 61/683,428, filed on Aug. 15, 2012, U.S. Provisional Application No. 61/694,649, filed on Aug. 29, 2012, and U.S. Provisional Application No. 61/794,292, filed on Mar. 15, 2013. The entire disclosures of the above applications are incorporated by reference herein.

FIELD

The present disclosure relates to power-saving stations in wireless networks, and more particularly to restrictions on active polling stations.

BACKGROUND

FIG. 1 shows three stations operating in accordance with a power-saving scheme as specified in the IEEE standard 802.11-2012, the entire disclosure of which is incorporated by reference herein. A station that operates in accordance with such a power-saving scheme (or any other power-saving scheme described herein) is referred to herein as a "power-saving station". In FIG. 1, three stations A, B, and C form an independent basic service set (IBSS), in an arrangement referred to as ad hoc mode. Each of the stations alternates between a doze (or, sleep) state, in which data is not transmitted or received, and an awake state in which data can be transmitted and received. Entering the doze state may also be referred to as entering a power-save mode, and waking up may also be referred to as exiting the power-save mode. Each of the stations is required to wake up just before each beacon, three of which are shown at 104-1, 104-2, and 104-3 (collectively, "beacons 104").

After waking up for a beacon, each station remains awake for a period of time called an announcement traffic indication message (ATIM) window. During the ATIM window, each station determines whether buffered data can be sent to other stations and whether to expect to receive data buffered from other stations. Data may be sent in networking frames or networking packets. The networking frames/packets may carry data and/or control signals, such as acknowledgement signals.

For example, see the ATIM window following beacon 104-2 of FIG. 1. Station A transmits an ATIM frame 108 to station B, which is shown receiving the ATIM frame at 112. Station B acknowledges that station B will wait to receive data from station A by transmitting an acknowledgment 116, shown being received by station A at 120.

Because station A has identified an available recipient for a buffered frame, and because station B expects to receive a frame, stations A and B will remain in the awake state after the ATIM window and not return to the doze state. By contrast, station C, which does not have frames to transmit to stations A or B, and has not been notified of any queued frames at station A or station B, returns to the doze state at the end of the ATIM window.

As prearranged, after the ATIM window, station A transmits a data frame 124 to station B, which is shown receiving the data frame at 128. Station B signals a successful transmission by transmitting an acknowledgement 132 to station A, shown being received at 136. Stations A and B then remain awake for the remainder of the beacon interval—i.e., the time until the next beacon 104-3. Stations A and B, along with station C, are all awake for the ATIM window following beacon 104-3. This approach allows stations to doze for a significant portion of each beacon interval, and only remain awake when data transfer has been prearranged.

SUMMARY

A wireless station includes a transceiver configured to wirelessly receive networking frames over a wireless medium, and a channel access counter configured to track a time period and signal that the time period has expired. The time period begins in response to a first networking frame of the networking frames. The first networking frame is addressed to a receiver other than the wireless station. A length of the time period is based on a first length in response to a type of the first networking frame being an acknowledgment frame type. The length of the time period is based on a second length in response to the type of the first networking frame being a data frame type. The transceiver is configured to wait to access the wireless medium until after the channel access counter signals that the time period has expired.

A wireless access point includes a beacon creation module, an association module, and a transceiver. The beacon creation module is configured to create a beacon that defines a restricted access window and a blackout window. A time period of the restricted access window is mutually exclusive with a time period of the blackout window. The association module is configured to, in the beacon, assign a slot in the restricted access window to a wireless station. The association module is configured to select the slot so that the slot is spaced apart from the time period of the blackout window by at least a clock drift offset. The clock drift offset is determined based on a maximum sleep period for the wireless station. The transceiver is configured to wirelessly transmit the beacon.

A method of operating a wireless station includes wirelessly receiving networking frames over a wireless medium, and tracking a time period. The time period begins in response to a first networking frame of the networking frames. The first networking frame is addressed to a receiver other than the wireless station. A length of the time period is based on a first length in response to a type of the first networking frame being an acknowledgment frame type. The length of the time period is based on a second length in response to the type of the first networking frame being a data frame type. The method also includes generating an expiration signal in response to the time period expiring. The method also includes waiting to access the wireless medium until the expiration signal has been generated.

A method of operating a wireless access point includes creating a beacon that defines a restricted access window and a blackout window. A time period of the restricted access window is mutually exclusive with a time period of the blackout window. The method also includes determining a clock drift offset for a wireless station based on a maximum sleep period for the wireless station. The method also includes selecting a slot in the restricted access window for the wireless station so that the slot is spaced apart from the time period of the blackout window by at least the clock drift offset. The method also includes assigning the slot to the wireless station in the beacon, and wirelessly transmitting the beacon.

BRIEF DESCRIPTION OF DRAWINGS

FIG. 4A is an example compressed timeline of beacons with indicated wakeup times for an active polling station.

FIG. 4B is an example timeline showing a scheduled wakeup time for an active polling station and potential clock drift around that wakeup time.

FIG. 6A is an example timeline of an active polling station sending a poll frame during a restricted access window and, after the restricted access window, requesting downlink data.

FIG. 6B is an example timeline of an active polling station sending a brief poll frame during a restricted access window and, after the restricted access window, transmitting uplink data.

FIG. 11A is an example format for a poll frame.

FIG. 11B is another example format of a poll frame.

FIG. 11C is an example format of a response frame.

FIG. 11D is an example format for a shortened CF-END frame.

In the drawings, reference numbers may be reused to identify similar and/or identical elements.

DESCRIPTION

Figure 1:
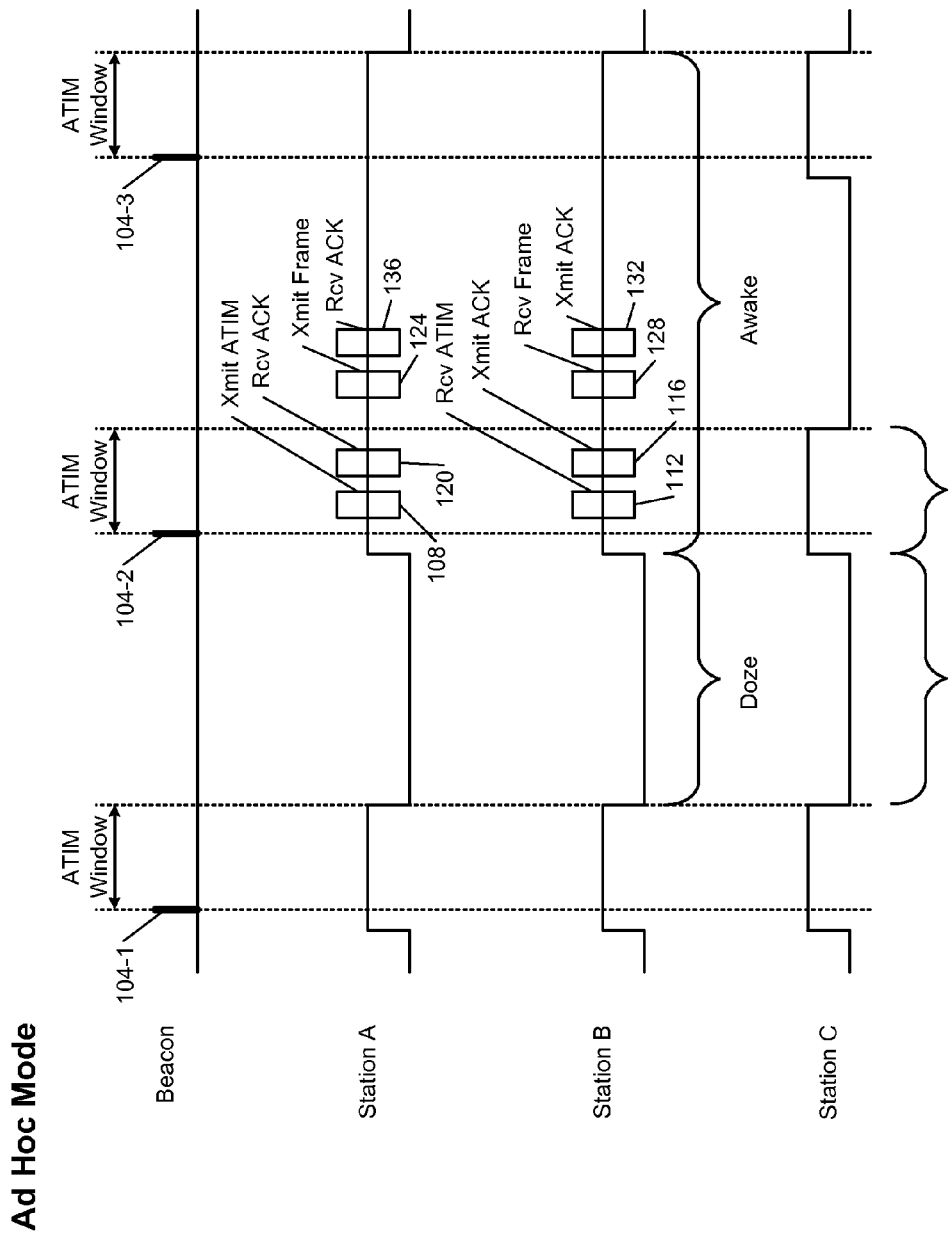
FIG. 1 is a graphical timeline of power-saving operation in an ad hoc wireless network.

The concept of an ATIM window as used in ad hoc mode can be adapted to infrastructure mode. In an infrastructure basic service set (BSS), beacons are periodically transmitted by an access point (AP) based on a target beacon transmission time (TBTT). Stations operating in accordance with a power saving operation (e.g., power-saving stations) and that are associated with the BSS are expected to wake up to receive each beacon that includes a delivery traffic indication message (DTIM).

In the DTIM, the AP can announce a window of time, following the DTIM, during which transmissions can be pre-arranged. Power-saving stations may return to a doze state if no relevant transmissions are arranged during this window. This window is referred to in this disclosure as one type of restricted access window.

The AP may be able to create more than one restricted access window in any given beacon interval, and can designate a wide variety of restrictions, described in more detail below. Allowing time for prearranging of transmissions is only one potential use of the restricted access window. Further, a restricted access window can be divided into multiple, different portions, with various uses for each portion. For example only, and as described in further detail below, the AP may assign certain stations to respective portions of a restricted access window.

When a station joins an infrastructure BSS, the AP assigns an association identifier (AID) to the station and uses that AID to refer to the station instead of some other mechanism, such as a medium access control (MAC) address. For example only, while a MAC address may be 48 or 64 bits long, an AID may be shorter, such as 11, 14, or 16 bits long.

In various implementations, the DTIM may include a partial virtual bitmap, each bit corresponding to an AID of a station. In one implementation, by setting the corresponding bit in the partial virtual bitmap to one, the AP indicates to the station that the AP possesses buffered frames for the station. When a station recognizes that the bit corresponding to the AID of the station is set to one in the partial virtual bitmap, the station should request the data (e.g., the buffered frames) from the AP. For purposes of illustration only, the AP may support up to two thousand eight stations, and therefore uses up to two thousand eight AIDs. In these cases, the partial virtual bitmap can be up to two thousand eight bits long, although the use of compression means that the partial virtual bitmap is often much shorter.

In a large BSS with a significant number of stations, there may be many bits set in the partial virtual bitmap, indicating that the AP is buffering frames for many stations. There may also be many stations that wish to uplink data to the AP. The AP may use a restricted access window to determine which stations are available to receive the buffered frames, and which stations may wish to uplink data to the AP.

The AP may announce a restricted access window using a data structure within the DTIM. In a simple case, the restricted access window begins upon completion of the DTIM and ends after a specified period of time. During the restricted access window, transmissions to the AP may be limited in various respects. For example, only certain types of frames may be sent, such as control, management, and null frames. For example, these frames may be used to schedule transmissions to occur subsequent to the restricted access window.

Within a wireless network, networking frames are transmitted and received. The networking frames may include a variety of frame types, including a control frame type, a management frame type, a null frame type, a data frame type, and combinations thereof. Further, each type may be a superset of other types—for example, an acknowledgement frame type may be a sub-type of the control frame type. When the restricted access window allows only control, management, and null frames, a station may indicate to the AP that the station has data to uplink to the AP. A station may also indicate to the AP that the station is present and requests retrieval of frames being queued by the AP. This request may be prompted by the station identifying the corresponding bit being set in the partial virtual bitmap of the DTIM, or may be made when the station is expecting data to be available at the AP. The restricted access window allows these requests to be made without interference from comparatively time-consuming data transmissions.

A restricted access window can be used for other purposes as well. For example, the restricted access window may allow only data frames belonging to certain access categories (quality of service levels). Such a restricted access window may allow for the highest priority data to be communicated without having to contend with lower priority data. The remainder of the beacon interval after the restricted access window concludes can be used for any traffic, including lower priority traffic. This ensures that at least a portion of the high priority traffic is accommodated during each DTIM beacon interval, even if there is a significant amount of lower priority traffic.

Additionally or alternatively, the restricted access window may restrict which stations can transmit—for example, limiting transmission to an explicitly defined subset of all the stations, or a predefined group of stations. For example, sensor stations may be differentiated from stations offloading data from cellular networks, which may be referred to as 3G offloading. The restricted access window may also be restricted to certain medium access parameters, such as using a short aSlotTime compared to a long aSlotTime. In addition, the restricted access window may be restricted to certain transmission types, such as a maximum transmission duration limit.

Stations having power consumption constraints may be allowed to use the restricted access window to better allow such stations to quickly return to a power-saving state. Such power-saving stations may schedule uplink and/or downlink transmissions to occur subsequent to the period of the restricted access window. Additionally or alternatively, the AP may allow a limited amount of data to be exchanged with these stations during the restricted access window.

When the AP has significant amounts of data buffered for a large number of stations, polling requests from individual stations during the restricted access window indicate those stations' willingness and ability to receive data. The AP may therefore, during the restricted access window, transfer corresponding queued frames from a software cache to hardware buffers to allow for prompt transmission of the queued frames following the restricted access window.

If the AP determines that the first restricted access window is underutilized, the AP may have the ability to prematurely end the restricted access window, thereby allowing regular data exchange to occur without waiting for the originally announced end of the restricted access window. The AP may also have the ability to preemptively cancel upcoming restricted access windows.

Stations that are more power-sensitive, referred to in this disclosure as active polling stations, may wake up only occasionally, such as once per day, and not necessarily in synchronization with beacons. These active polling stations may be allowed to transmit data immediately upon waking up, subject to channel access rules.

Data transmissions, poll frames, and uplink indication frames from these active polling stations may therefore occur at any time, including during restricted access windows where such packets would generally not be allowed. Upon waking up, an active polling station may be programmed to send a poll frame. The AP can respond to the poll frame by informing the active polling station of whether a restricted access window is currently in progress, when to expect a current restricted access window to end, and when to expect another beacon.

The AP may also indicate to the active polling station a BSS change sequence, which indicates to the active polling station how parameters of the BSS will be changing. The AP may also send a timestamp to allow the active polling station to synchronize with the clock of the AP and determine when the next scheduled beacon will be transmitted.

The AP may desire to reserve a portion of each beacon interval during which active polling stations are not allowed to transmit. This is referred to in the present disclosure as a blackout window. The blackout window may be used for different transmissions than the restricted access window. Alternatively, the blackout window may be a subset of the restricted access window, with the specific difference being that active polling stations are not allowed to transmit during the blackout window.

Some active polling stations wake up more regularly, and while there may be some clock drift between their clock and the clock of the BSS, synchronization is still maintained. Such active polling stations can be assigned one or more slots in a restricted access window, and are referred to as scheduled active polling stations. The assigned slots are selected such that the maximum expected amount of clock drift will not cause the scheduled active polling station to transmit during the blackout window. In other words, when the scheduled active polling station wakes up, the active polling station would ideally transmit during the assigned slot in the restricted access window. However, even if the clock of the active polling station has drifted from the clock of the BSS, the amount of drift will not be great enough to cause the active polling station to transmit within the blackout window.

Figure 2A:
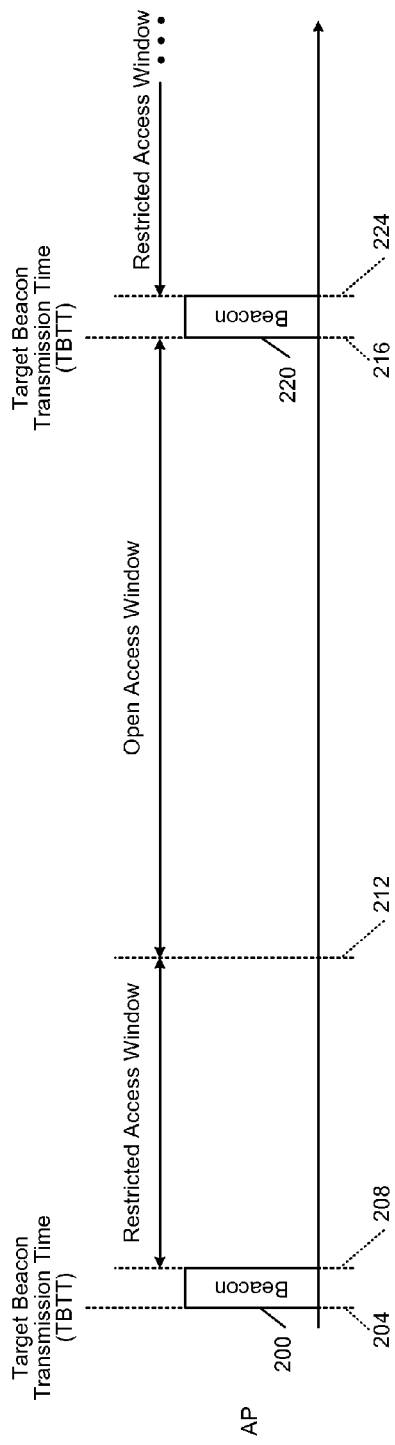
FIG. 2A is an example timeline of a beacon interval including a restricted access window.

In FIG. 2A, a beacon 200 is shown being transmitted at a target beacon transmission time (TBTT) 204. At the end of the beacon 200, indicated at 208, a restricted access window begins. The restricted access window ends at 212, where an open access window begins. The open access window lasts until a subsequent TBTT 216. A second beacon 220 is transmitted at the TBTT 216, and a second restricted access window begins at 224 following the second beacon 220. The relative lengths of the restricted access window and open access window can be set by the AP and the length of the restricted access window may vary from 100% of the beacon interval to 0% of the beacon interval.

Figure 2B:
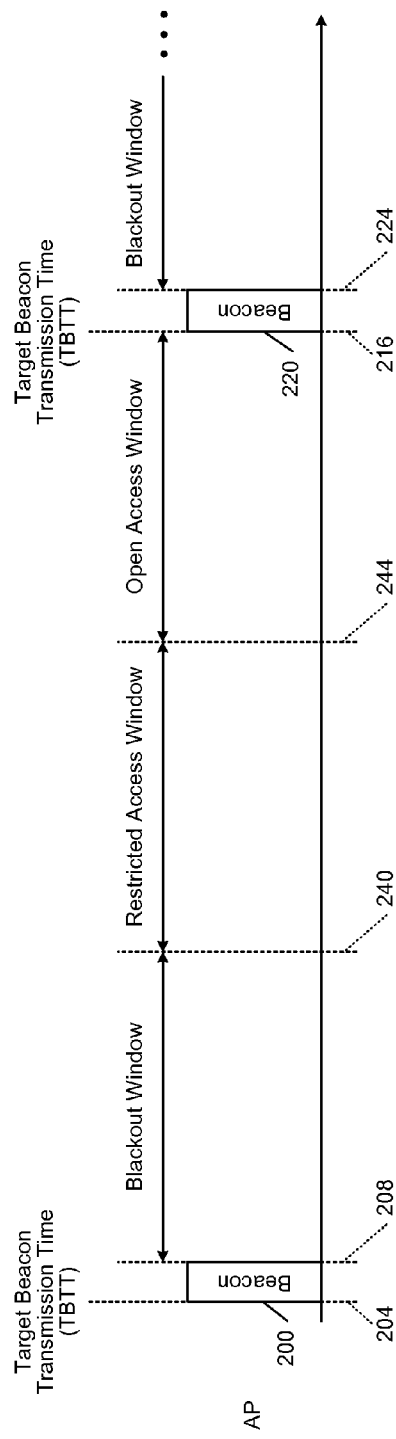
FIG. 2B is an example timeline of a beacon interval including a restricted access window and a blackout window.

In FIG. 2B, a blackout window is added. After the first beacon 200 ends at 208, the blackout window begins. At 240, the blackout window ends and a restricted access window begins. At 244, the restricted access window ends and an open access window begins. Although shown in the order of blackout window, restricted access window, open access window, the order may be different in different implementations. However, there may be advantages to placing the blackout window first. For example, power-saving stations that need to access the blackout window may wake up for the beacon 200, transmit and/or receive during the blackout window and then re-enter power-save mode by 240.

Figure 3:
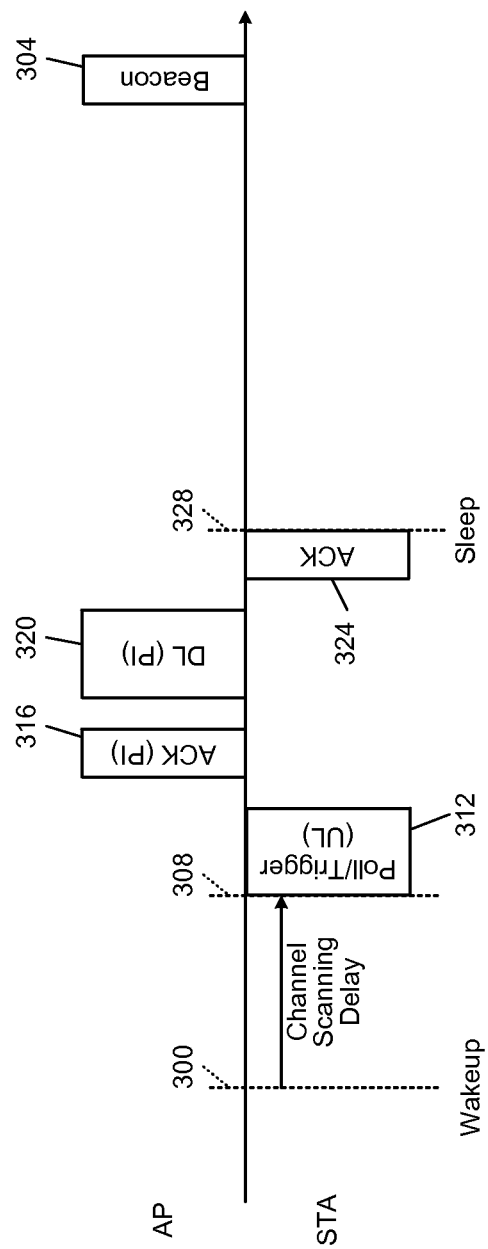
FIG. 3 is an example timeline of an active polling station waking and transmitting data.

In FIG. 3, an active polling station is shown waking up at 300. A beacon 304 is shown at the right-hand side simply to indicate that the wakeup time 300 may be asynchronous to the beacon 304. After a channel scanning delay, at 308 the active polling station sends a poll/trigger frame 312 including uplink (UL) data. If the active polling station had detected other transmissions between 300 and 308, the active polling station would have waited until a free period lasting at least the channel scanning delay had occurred.

The poll/trigger frame 312 may include uplink (UL) data. The AP acknowledges the uplink transmission with an ACK 316, which may include a pending data indication (PI) that indicates that the AP has data buffered for the active polling station. The AP may then transmit a downlink (DL) frame 320 to the active polling station. The active polling station will acknowledge receipt of the downlink data with an ACK 324 and return to sleep at 328.

While this is very power-efficient for the active polling station, the mechanism shown in FIG. 3 does not necessarily honor blackout windows defined by the AP. The blackout window may be used by the AP to provide restricted channel access to certain stations or certain transmission types or priorities. For example, a proxy station may use the blackout window to communicate with the AP. The AP may indicate a blackout window with a starting time and duration and indicate which station or group of stations, such as all active polling stations or all stations, are prevented from transmitting during the blackout window. The AP may also indicate one or more open access windows, such as by indicating the starting time and duration of the window.

In FIG. 4A is a sequence of beacons 400-1, 400-2, . . . 400-10 (collectively, beacons 400) on a timescale that is compressed relative to other timelines in this disclosure. A certain active polling station may be scheduled to wake up at a certain time after every third beacon. As shown in FIG. 4A, the active polling station is scheduled to wake up after the beacon 400-1, after the beacon 400-4, after the beacon 400-7, and after the beacon 400-10.

In FIG. 4B, one of the scheduled wakeup times is shown. Based on how often the active polling station is scheduled to wake up, the amount of potential clock drift can be estimated. The scheduled wakeup interval will then be placed at least that amount of clock drift after the boundary 240 between the blackout window and the restricted access window. In this way, even with the maximum amount of clock drift at the active polling station, the active polling station will still not transmit during the blackout window.

If the blackout window followed the restricted access window, the scheduled wakeup for the active polling station would be placed prior to the blackout window by at least the amount of expected maximum clock drift. For additional information about restricted access windows, see commonly assigned U.S. patent application Ser. No. 13/680,876, filed on Nov. 19, 2012, titled "802.11 Restricted Access Windows", the entire disclosure of which is incorporated by reference herein.

The wakeup time for a station can be scheduled when the station is associating with the AP and/or by using special management frames. Stations may decide whether to wake up at their scheduled wakeup times based on application activity in the station, whether uplink data is available, a time since downlink data was last received, and/or a maximum idle period beyond which the station could not remain associated with the AP. At this scheduled wakeup time, the station can use standard distributed channel access timings to access the channel. In various implementations, if a single station is scheduled to communicate at a certain point in time, the station may use shorter channel access parameters, such as the point coordination function interframe space (PIFS) instead of the distributed coordination function interframe space (DIFS).

The maximum amount of expected clock drift is referred to as a clock drift offset. The clock drift offset may be set based on a maximum out-of-sync interval, which specifies how long the station can operate as part of the BSS without listening for beacons. If an active polling station decides to remain asleep longer than the maximum out-of-sync interval, the active polling station may be required to conduct longer channel access (for example, for the length of ProbeDelay) to make sure the channel is idle or constrain the initial transmission to a very short frame only. Alternatively, the active polling station may be required to wait for another transmission, which may carry a timestamp, allowing the active polling station to resynchronize with the BSS. In various implementations, the active polling station may be required to wait for a beacon to reestablish synchronization.

Figure 5B:
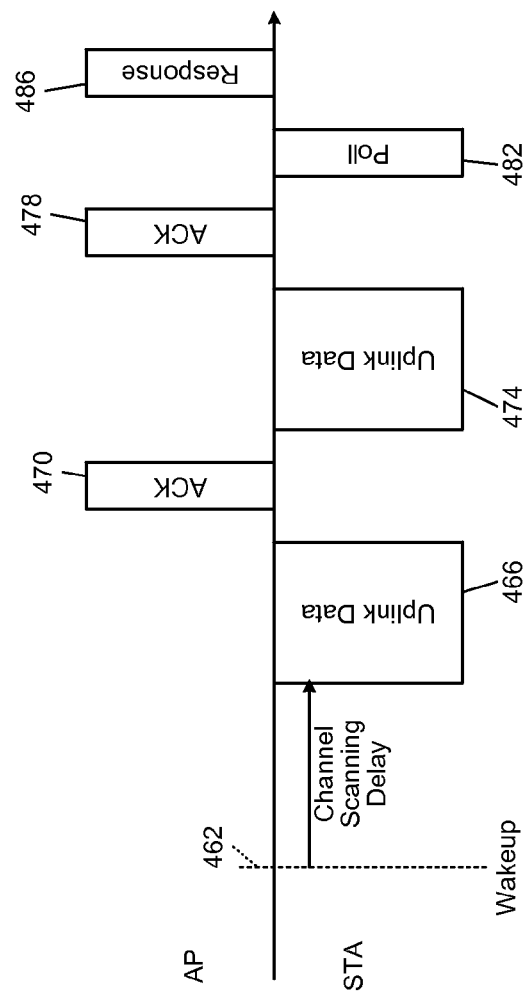
FIG. 5B is an example timeline of an active polling station sending uplink data after waking.
Figure 5A:
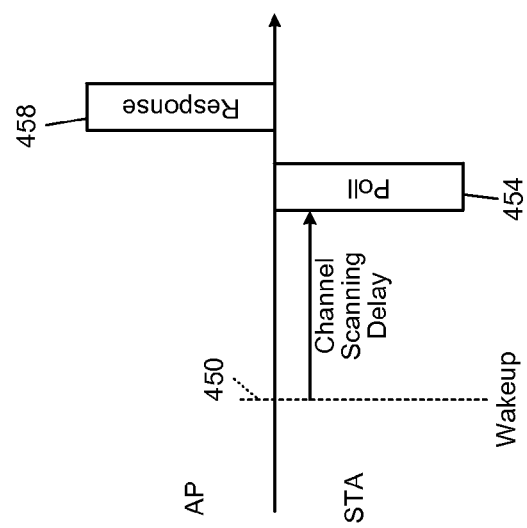
FIG. 5A is an example timeline of an active polling station waking and sending a short poll frame.

In FIG. 5A, an active polling station wakes up at 450 and after a channel scanning delay, transmits a poll frame 454. The AP responds with a response frame 458. The response frame 458 may include a timestamp and BSS update information to help the station re-sync to the AP and track any BSS updates. For additional information on BSS updates, refer to commonly assigned U.S. patent application Ser. No. 13/450,209, filed on Apr. 18, 2012, titled "Reducing Power Consumption in a Wireless Communication System", the entire disclosure of which is incorporated by reference herein. The response frame 458 may also indicate whether the active polling station is allowed to commence transmission and may include information about scheduled windows, such as blackout windows and restricted access windows.

In FIG. 5B, the active polling station wakes up at 462 and, after a channel scanning delay, transmits a frame 466 including uplink data. The AP acknowledges the uplink data with an ACK 470, and the station transmits another data frame 474. The AP once again acknowledges with an ACK 478. Because the station woke up at the assigned time, the station was permitted to directly begin sending uplink data. However, the station may still desire to retrieve information from the AP. Therefore, the station may follow up data transmission with a poll frame 482, to which the AP responds at 486. The poll frame 482 and response frame 486 may be similarly or identically structured to the poll frame 454 and the response frame 458 of FIG. 5A. The response frame 458 may specify whether data is pending for the station, and is discussed in more detail below.

In FIG. 6A, a beacon 500 may initiate a restricted access window. When an active polling station wakes up and sends a poll frame 504, the AP sends a response frame 508, which may indicate that the active polling station should wait until the end of the restricted access window to begin receiving data. The response frame 508 may also indicate to the active polling station whether there is data queued at the AP for transmission to the station.

After the restricted access window, if there is data queued for the station, the station may send a poll/trigger frame 512 to the AP to trigger downlink data. The AP responds with data frame 516, which the station acknowledges at 520. Additional data frames, such as data frame 524, may be sent by the AP, which is acknowledged by the station with an ACK 528.

In FIG. 6B, a beacon 550 initiates a restricted access window. A poll frame 554 is sent by an active polling station that has woken from a sleep state, and the AP responds with a response frame 558. The response frame 558 may indicate that no data is pending for the station. After the restricted access window ends, the station may begin transmitting uplink data including first and second data frames 562 and 566, which are acknowledged by the AP with ACKs 570 and 574, respectively.

If the station has a large amount of data to transmit, the station may continue transmitting until the next TBTT, at which point transmission stops so that the AP can send the beacon. If the station still needs to access the channel, the station can monitor the beacon to determine when the next appropriate window may be. The station may return to sleep until the time at which the station can resume transmitting uplink data.

In various implementations, the station may be allowed to transmit during windows in which the station would ordinarily be prohibited from transmitting. This transmission allowance may include various restrictions, such as the requirement that the station use a longer channel access delay (e.g., a channel access delay corresponding to a lower quality of service).

After transmitting uplink data, the station may need to check for a response prior to the next normally scheduled wakeup time. For example, this may be the case when expecting an endpoint acknowledgment according to transmission control protocol (TCP). Instead of waiting for the next scheduled wakeup time, the station may wake up before the next beacon to identify the next open access window, and probe the AP for possible downlink data.

The station may solicit a response frame from the AP indicating the time at which the next open access window will occur. The station may then wait until that point to request data from the AP. If an active polling station has urgent uplink data to transmit before the next scheduled wakeup time, the station can wake up before the next beacon and listen for the next beacon to be transmitted. The station can then transmit during appropriate times of a restricted access window and/or during the next open access window.

In various implementations, the active polling station may be allowed to, at any point, send a short poll frame after acquiring channel access, which solicits a response frame from the AP with information regarding the next beacon or the next open access window. When accessing the medium without regard to windows, the active polling station may be required to wait for the channel to be free for greater than a longer time period, such as ProbeDelay. In various implementations, a station may request permission to transmit, and the AP is able to grant that specific request even during restricted access windows or blackout windows.

In various implementations, stations may generate on-demand uplink data. For example, certain sensors, such as light switch sensors, may generate on-demand data in response to environmental stimulus. Some sensor applications may take sensor readings periodically, but generate uplink transmissions only when the readings change by more than a predetermined amount. In various implementations, application layers in a station may generate periodic uplink transmissions, which are queued for transmission by the MAC layer.

Active polling stations may be segmented into two groups, scheduled and unscheduled. This grouping may be performed upon association with the AP, may be hard coded at the factory, and/or may change on demand. Scheduled active polling stations will receive time slots during which they can transmit data. Because active polling stations may not wake up frequently, there may be clock drift since the last synchronization with the AP. As a result, the assigned slot may be located at least a clock drift offset away from any blackout window.

Meanwhile, unscheduled active polling stations may wake up so infrequently that the amount of clock drift could be greater than the size of the restricted access window and potentially even greater than the length of a beacon interval. Therefore, these unscheduled active polling stations may be allowed to send a short poll frame upon waking up in order to determine when the station can access the medium. This frame may be very short, as described in more detail below, so that even if sent during a blackout window, the active polling station will not unduly limit the available transmission time during the blackout window.

When the AP sends a response frame to the unscheduled active polling station, the response frame may indicate an interval during which the station must defer access. The station will not begin any transmissions during the specified interval and the AP will not send any data to the station during this interval. As a result, the station may enter a power-save mode for the remainder of the deferred interval.

Figure 7:
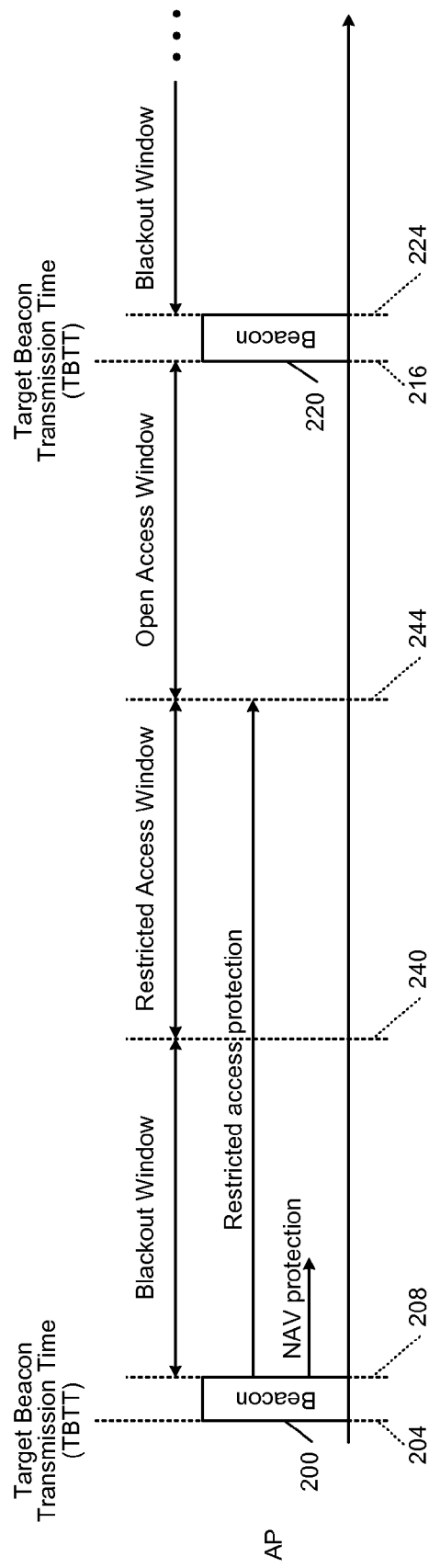
FIG. 7 is an example timeline including a restricted access window and a blackout window within a beacon interval, and showing example protection arising from restricted access and from a network allocation vector.

In FIG. 7, protection for various transmission sequences is shown. The blackout window and restricted access window provide what is called restricted access protection from 208 to 244. Meanwhile, NAV (network allocation vector) protection may be shorter than the blackout window or the restricted access window. When a frame is transmitted, a duration field in the MAC header may specify how long the data interchange is expected to take.

This duration is used to set the NAV in any nodes that are able to receive that transmission, even nodes in an overlapping BSS (OBSS). To prevent collisions, nodes will not begin any transmissions during the period specified by the NAV. As a result, the station whose duration field set the NAV for other nodes can continue to transmit data without risk of other stations attempting to transmit and potentially causing collisions.

The maximum length of this NAV protection may be limited to the maximum transmission opportunity (TXOP) duration. The TXOP is an interval of time when a particular quality-of-service station has the right to initiate frame exchange sequences onto the wireless medium. The TXOP is either obtained by the station after successfully contending for the channel or assigned by a hybrid coordinator. The NAV protection reduces power in other stations because the other stations do not need to sense the medium for potential transmission until the NAV protection has expired.

To prevent interference with a poll and response interchange between an active polling station and an AP, a physical layer parameter called ProbeDelay may be set to the sum of a longest poll frame transmission duration, SIFS (short interframe space), and a response preamble. Because the longest poll frame duration is less than the maximum frame duration, the ProbeDelay may instead be set based on the sum of SIFS, a response preamble, and a maximum transmission time for a physical layer convergence procedure (PLCP) protocol data unit (PPDU). For more information regarding interframe spacing, see commonly assigned U.S. application Ser. No. 13/680,831, filed on Nov. 19, 2012, titled "802.11 Enhanced Distributed Channel Access", the entire disclosure of which is incorporated by reference herein.

Figure 8A:
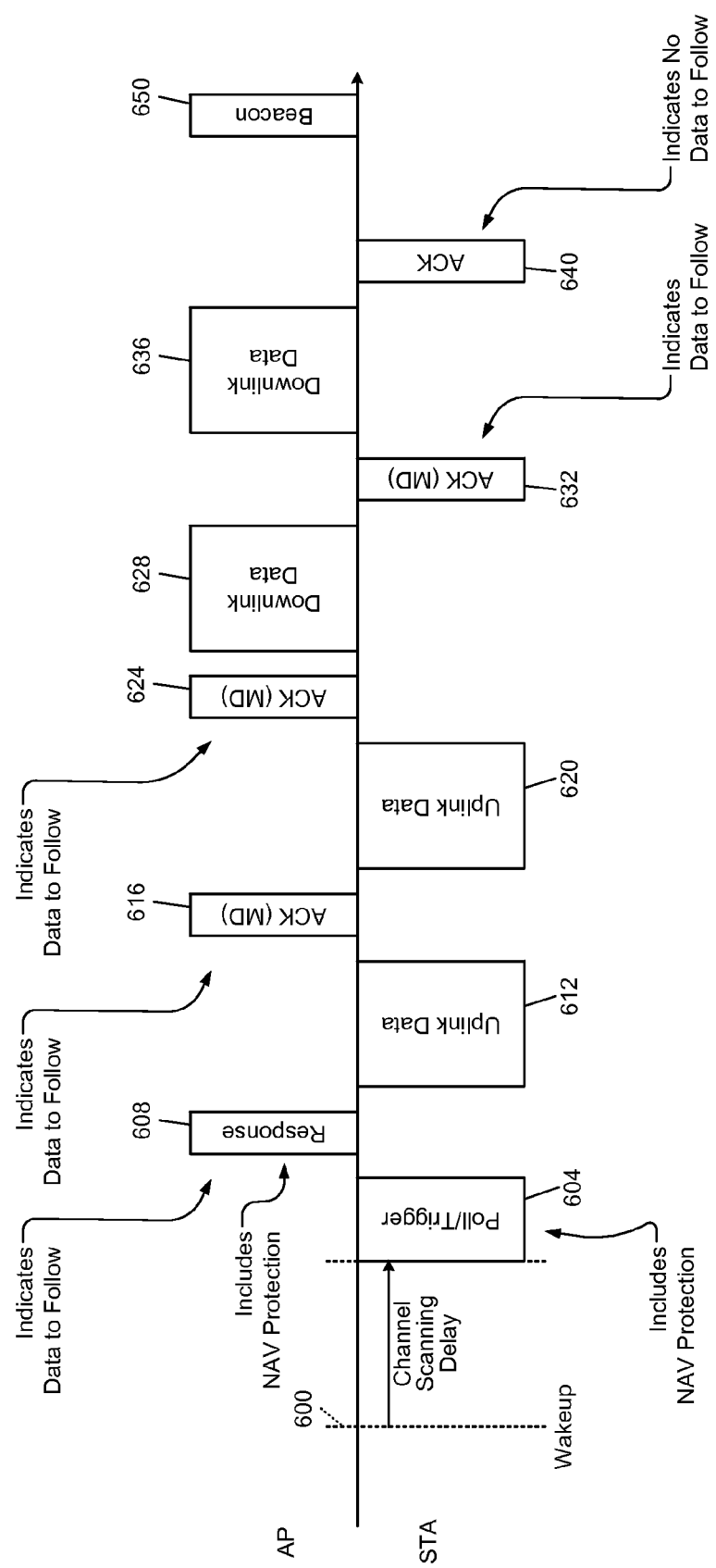
FIG. 8A is an example timeline showing data interchange between an active polling station and an access point including signaling to indicate further data transmission.

In FIG. 8A, an active polling station wakes up at 600 and transmits a poll/trigger frame 604. The poll/trigger frame 604 includes a duration that begins NAV protection for the following data interchange. The AP sends a response frame 608, which also includes a duration field so that stations that can receive from the AP but not from the active polling station will know to set the NAV correctly.

The response frame 608 may also indicate that more data is to follow. This tells other stations that another uplink transmission to the AP should be expected. That transmission is a data frame 612, which is acknowledged by the AP with an ACK 616. The ACK 616 indicates that more data will follow, and the station transmits an additional uplink data frame 620. The AP sends an ACK 624 indicating that more data is to follow. In this case, uplink data may be finished and so the AP sends a downlink data frame 628 to the station. The station acknowledges the data with an ACK 632, which indicates more data is expected. The AP sends an additional downlink data frame 636, which is acknowledged with an ACK 640. The ACK 640 indicates that more data is not expected, such as by setting a more data (MD) bit to 0. This indicates to other stations that additional data is not expected to be interchanged. A beacon 650 is shown simply to demonstrate that the previous interchange may not be aligned with the beacon and may occur in an open access window prior to the beacon 650.

Figure 8B:
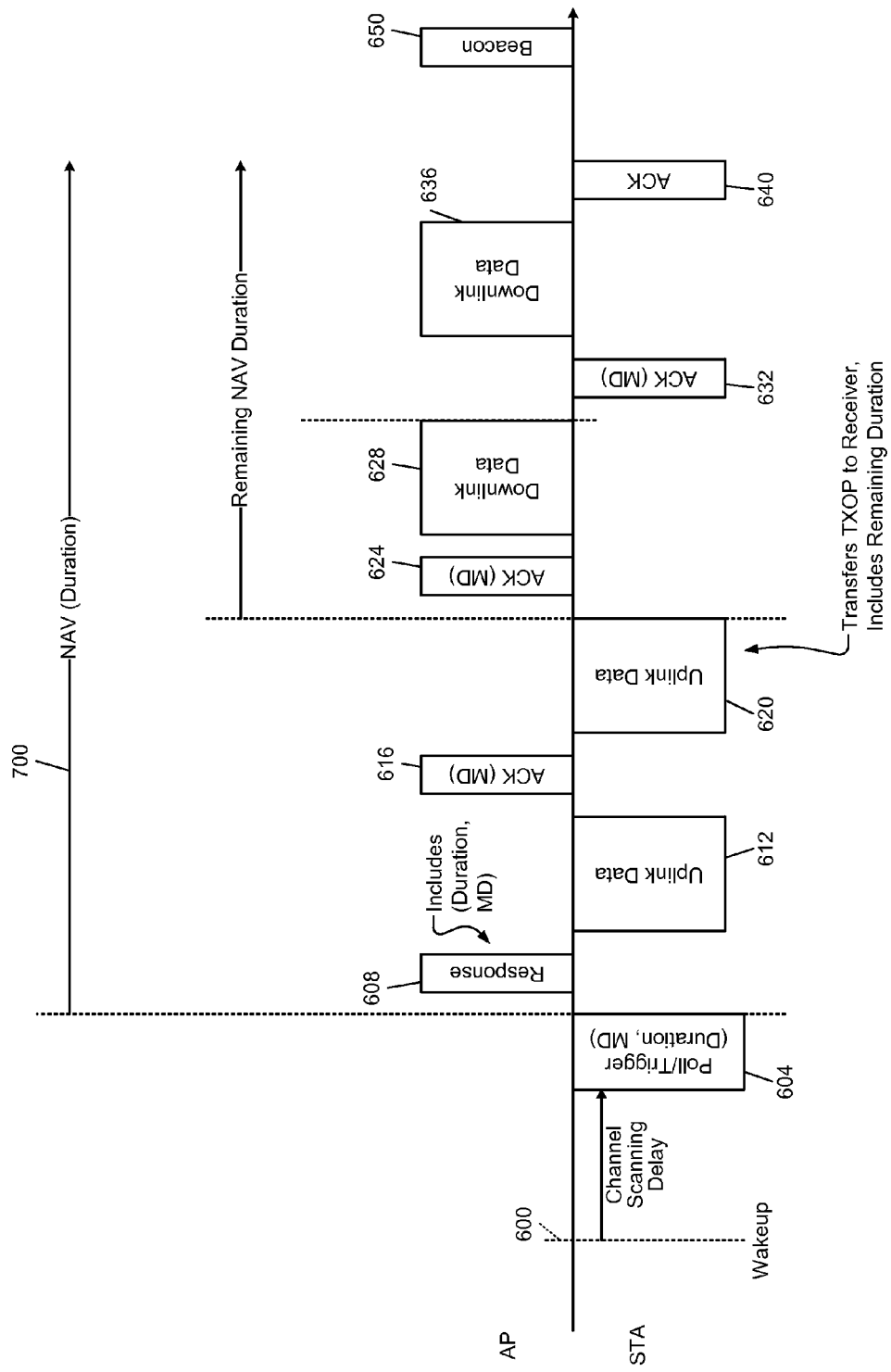
FIG. 8B is an example timeline depicting network allocation vector protection for data interchange.

In FIG. 8B, an example of the poll/trigger frame 604 is shown including a duration and a more data (MD) indication. The duration causes receiving stations to set the NAV—until the NAV expires, the receiving stations will not transmit. The NAV is shown at 700. In the uplink data frame 620 including the last uplink data from the station, control of the transmission opportunity is passed to the receiver, in this case the AP. The AP is therefore given the opportunity to transmit for the remainder of the initial NAV. The AP uses this opportunity to transmit the data frames 628 and 636.

Figure 8C:
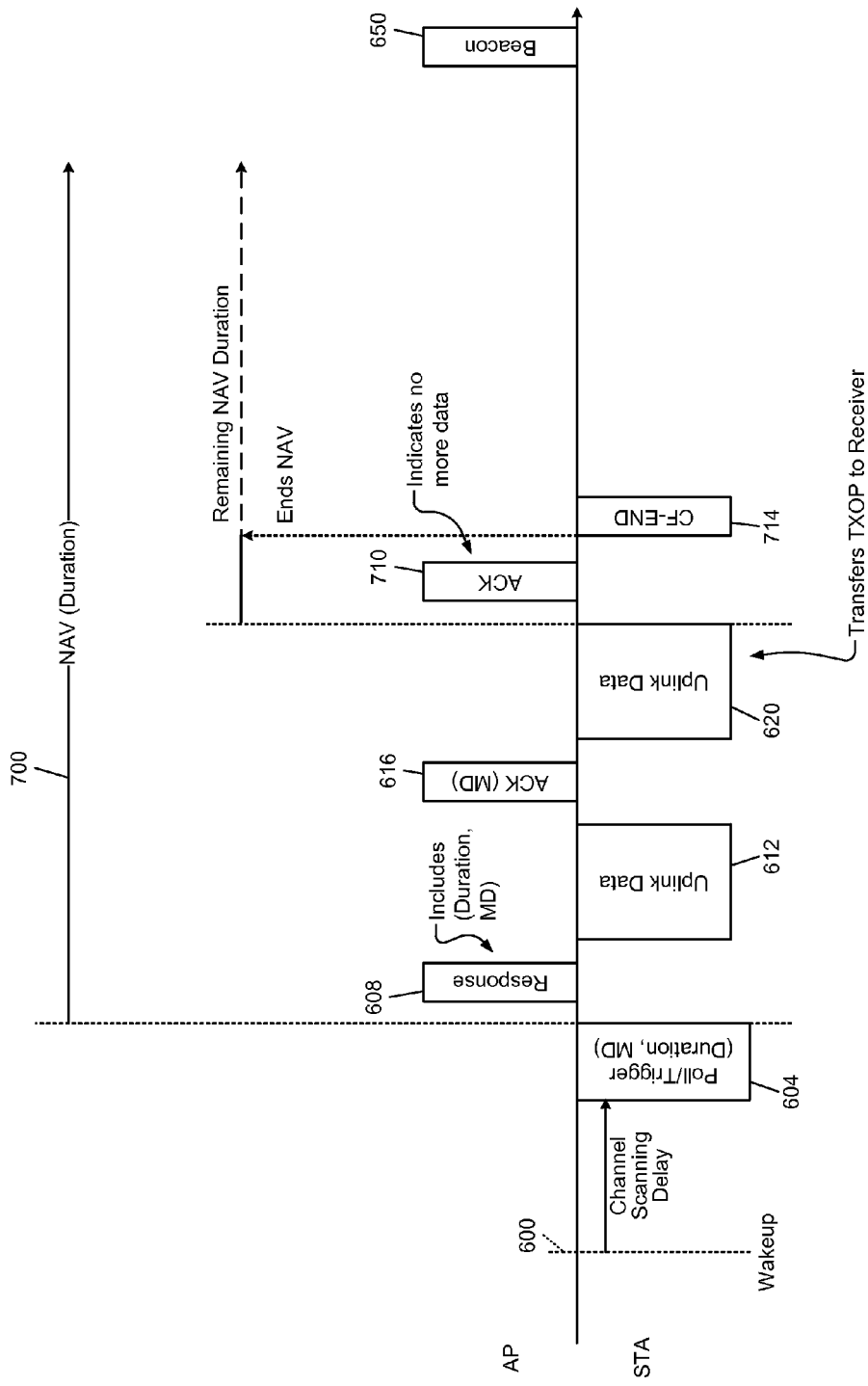
FIG. 8C is an example timeline depicting network allocation vector protection being prematurely ended upon conclusion of data interchange.

In FIG. 8C, after receiving the remaining portion of the transmission opportunity, the AP sends an ACK 710 indicating that no more data will be sent from the AP to the station. As a result, the remaining portion of the NAV will not be used. To open up the channel for other stations, a CF-END frame 714 is transmitted to end the NAV. Although shown as being transmitted by the station, in various implementations the CF-END may additionally or alternatively be transmitted by the AP.

Figure 8D:
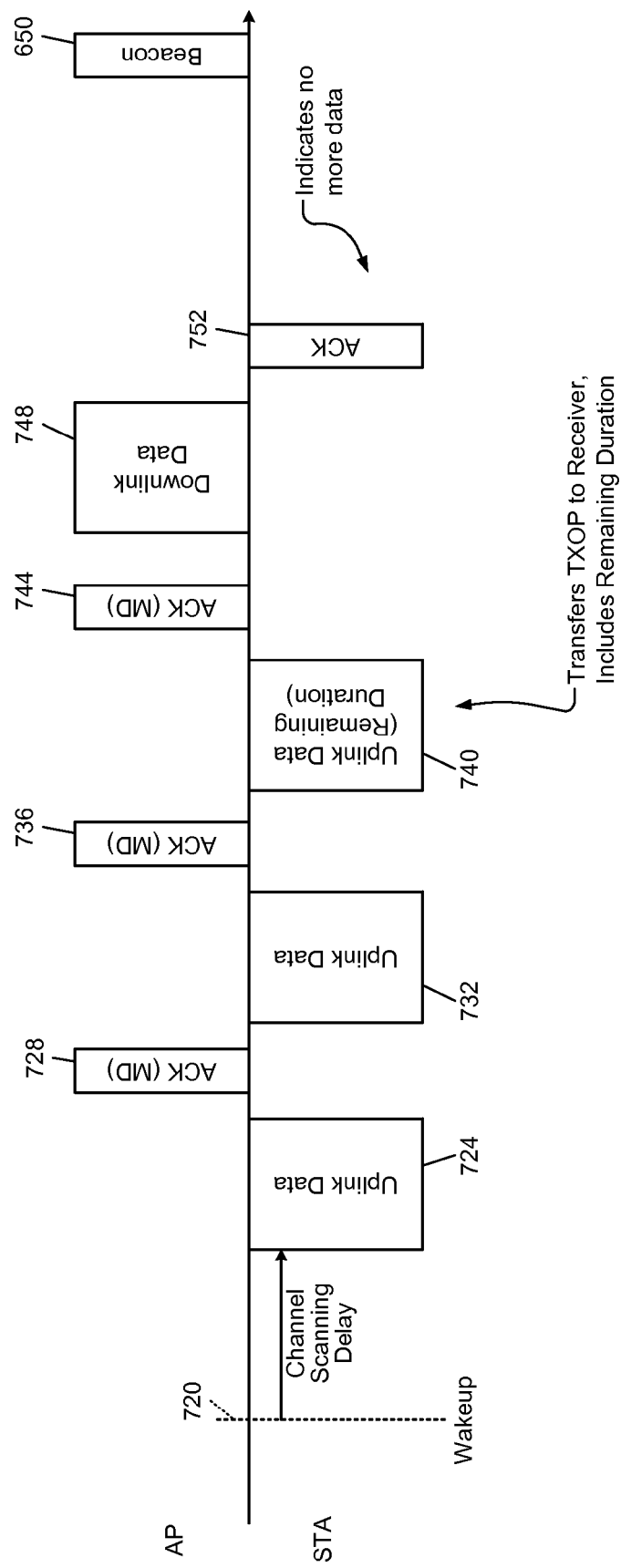
FIG. 8D is an example timeline depicting an active polling station transferring a remaining duration of a network allocation vector to an access point.

In FIG. 8D, the station wakes up at 720 and after a channel scanning delay, sends a data frame 724 including uplink data. The data frame 724 may include a duration field to set the NAV for listening stations. The AP acknowledges with an ACK at 728, which includes a more data (MD) indication. The station then sends a data frame 732 including additional uplink data, which is acknowledged by an ACK 736. The station then sends a final data frame 740 including a transfer of the remaining duration of the transmission opportunity to the AP. The AP acknowledges the transmission with an ACK 744, which indicates more data. The AP then sends a data frame 748 including downlink data. The station acknowledges the downlink data with an ACK 752.

Figure 9:
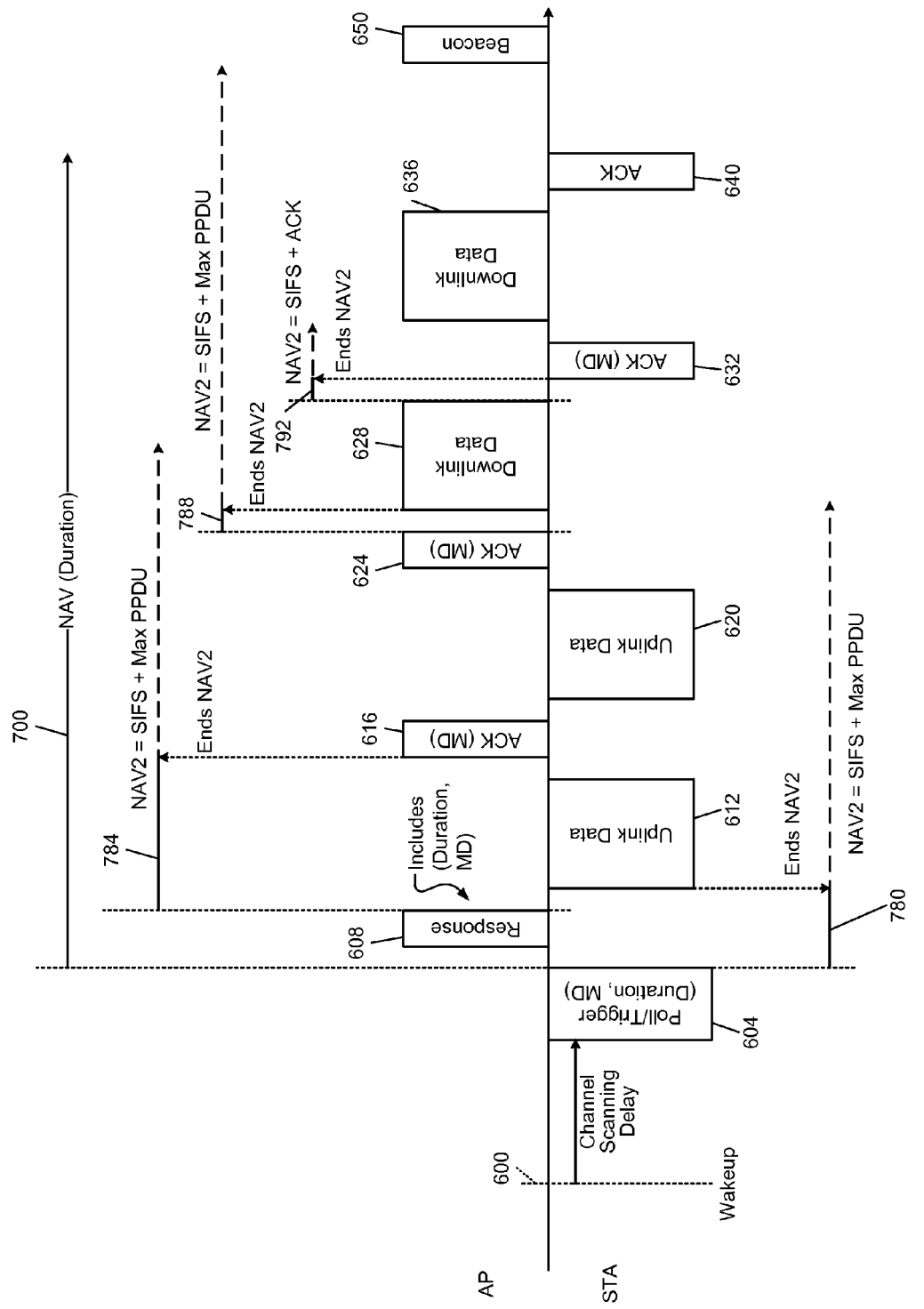
FIG. 9 is an example timeline depicting an additional channel access protection mechanism.

In FIG. 9, an additional mechanism of protecting channel access is shown. The same frames from FIG. 8B are used in this illustration. The standard NAV 700 remains, but an additional protection, referred to as NAV2, is added. When the poll/trigger frame 604 has been sent, listening stations recognize that a response will be sent and therefore set a NAV2 timer 780 based on the longest expected time for the response to take. When the length of the response is not constrained, the maximum length may be the maximum length of a PPDU. Taking into account the spacing between the poll/trigger frame 604 and the response frame 608, which may be SIFS, listening stations set the NAV2 timer 780 to be the sum of SIFS and the maximum PPDU.

The NAV2 timer 780 created by the poll/trigger frame 604 is ended when the data frame 612 is sent. In other words, the standard NAV 700 is set by a duration field and can be cancelled by a CF-END frame. The NAV2 timer 780 is set by an indication that a response or data is expected to follow, and is cancelled by the next correctly received frame. Stations that implement NAV2 should not begin transmission before the end of either the current NAV or the current NAV2. In other words, the station waits for the longer of NAV and NAV2.

When the response frame 608 is sent, another NAV2 timer 784 begins because the response frame 608 indicates that more data is to follow. The NAV2 timer 784 is ended when the ACK 616 is sent. When the ACK 624 is sent, the more data indication signals that a NAV2 timer 788 should be set based on the expected additional data. The NAV2 timer 788 is ended by transmission of the data frame 628. Because an acknowledgement is expected in response to a data packet, such as the data frame 628, a NAV2 timer 792 is set in response to the data frame 628. The corresponding ACK 632 ends the NAV2 timer 792.

Because the length of an ACK is defined and is less than the maximum PPDU, NAV2 resulting from a data frame can be set to the sum of SIFS and the length of an ACK. To minimize complexity in the illustration, additional setting of NAV2 for the data frames 612, 620, and 636 is omitted as is the setting of NAV2 for the ACK 616 and the ACK 632. Referring back to FIG. 8B, the uplink data frame 620 that reverses direction of the transmission opportunity (TXOP) can set NAV2 equal to a sum of SIFS, a transmission time for an ACK, a second SIFS, and a transmission time for a maximum PPDU. This protects the following downlink data frame 628 from collision with any station that can hear the transmitter of the uplink data frame 620.

Figure 10A:
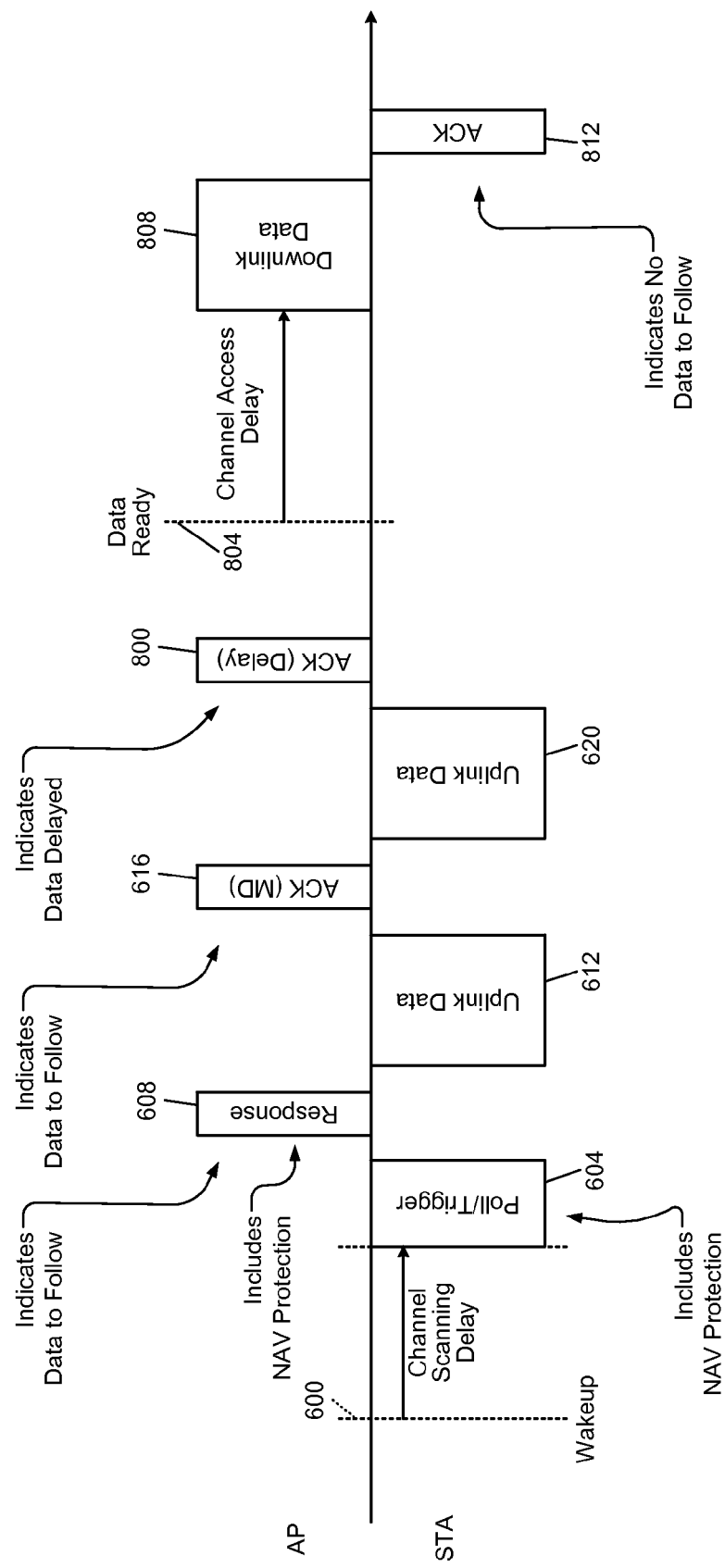
FIG. 10A is an example timeline of data interchange where the access point needs additional time before downlink data is ready.

In FIG. 10A, an example of the AP not having data ready for the station is shown. After the uplink data frame 620, the AP sends an ACK 800 indicating that downlink data will be delayed. Once the downlink data is ready, shown at 804, the AP waits until channel access is available and then transmits a data frame 808 including the downlink data. The station transmits an ACK 812 in response to successful reception of the downlink data.

Figure 10B:
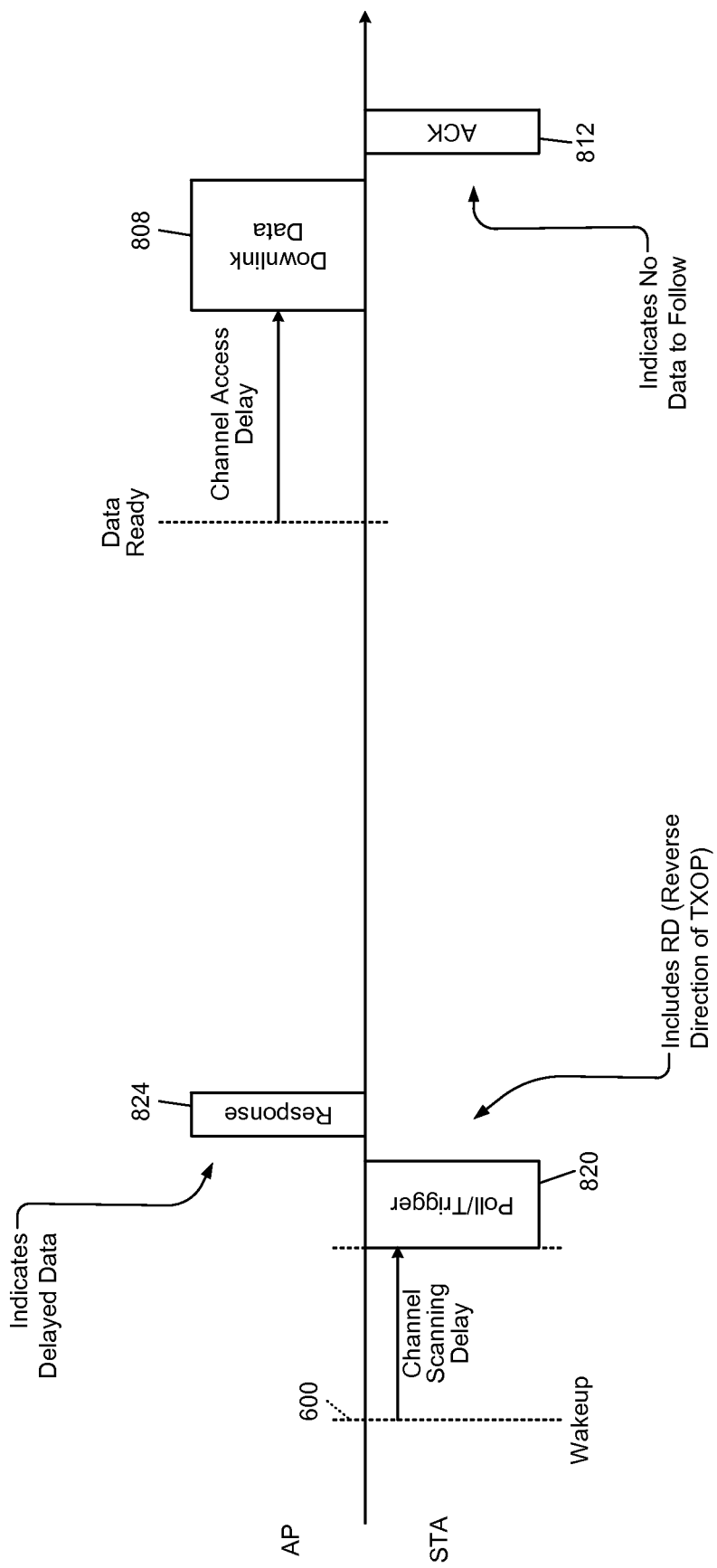
FIG. 10B is an example timeline where an active polling station has no data to send and the access point requires time to prepare downlink data for the active polling station.

In FIG. 10B, the station has no uplink data to transmit and therefore transmits a poll/trigger frame 820 including a reverse direction grant of the remaining portion of the TXOP to the AP. The AP responds to the poll/trigger frame 820 with a response frame 824. If downlink data is queued but not immediately ready for the station, the response frame 824 may indicate that data is delayed. Once the data is ready, the AP transmits the data frame 808, which may be similar to that of the data frame 808 in FIG. 10A. The station then acknowledges with the ACK 812.

Figure 10C:
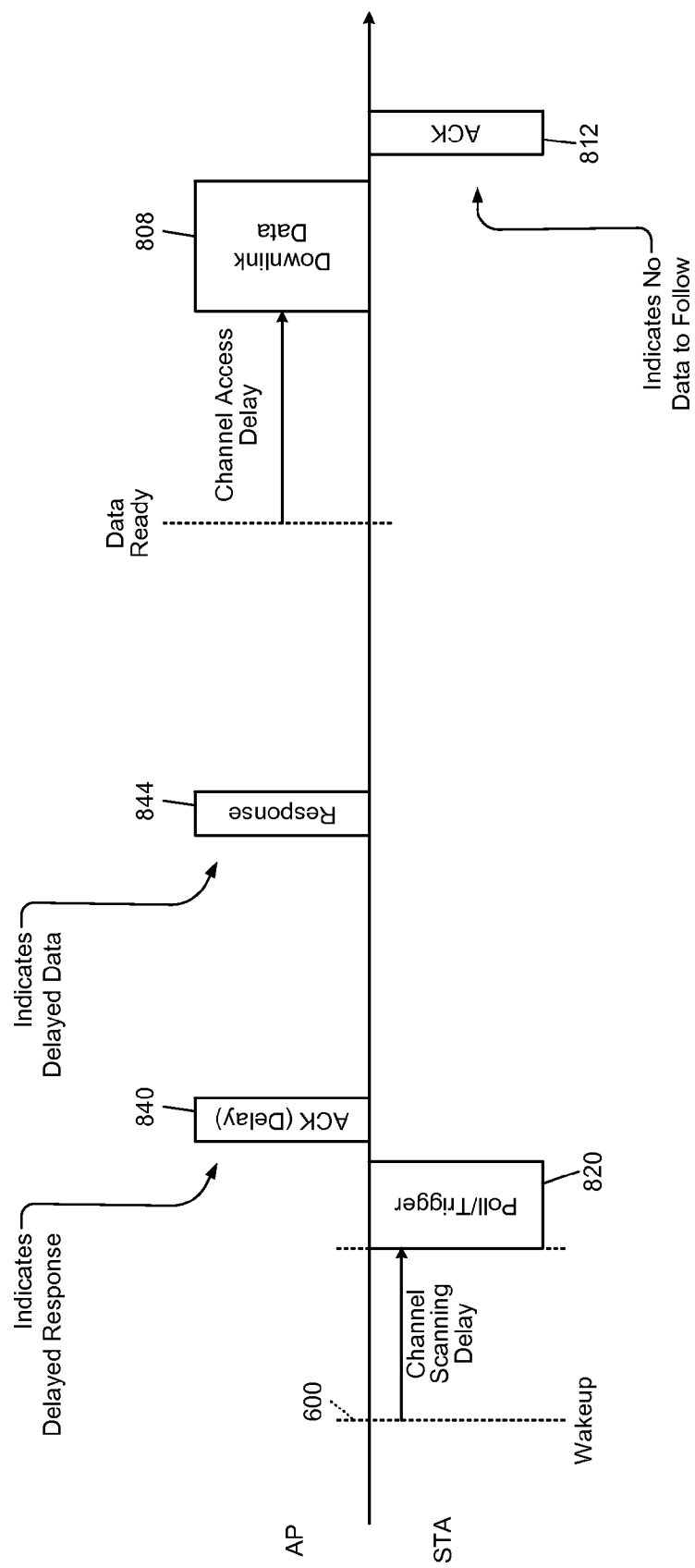
FIG. 10C is an example of an access point taking time to prepare a response to a poll frame from an active polling station, and taking further time to prepare downlink data.

In FIG. 10C, when receiving the poll/trigger frame 820, the AP may not be ready to transmit a poll response. Therefore, the AP may send nothing or may send a short packet, such as an ACK 840, which indicates that a response is not yet ready. The AP sends a response frame 844 once the response frame 844 is ready. The response frame 844 may be sent as soon as possible, as shown in FIG. 10C, or may be delayed until the data frame 808 is ready for sending.

Figure 10D:
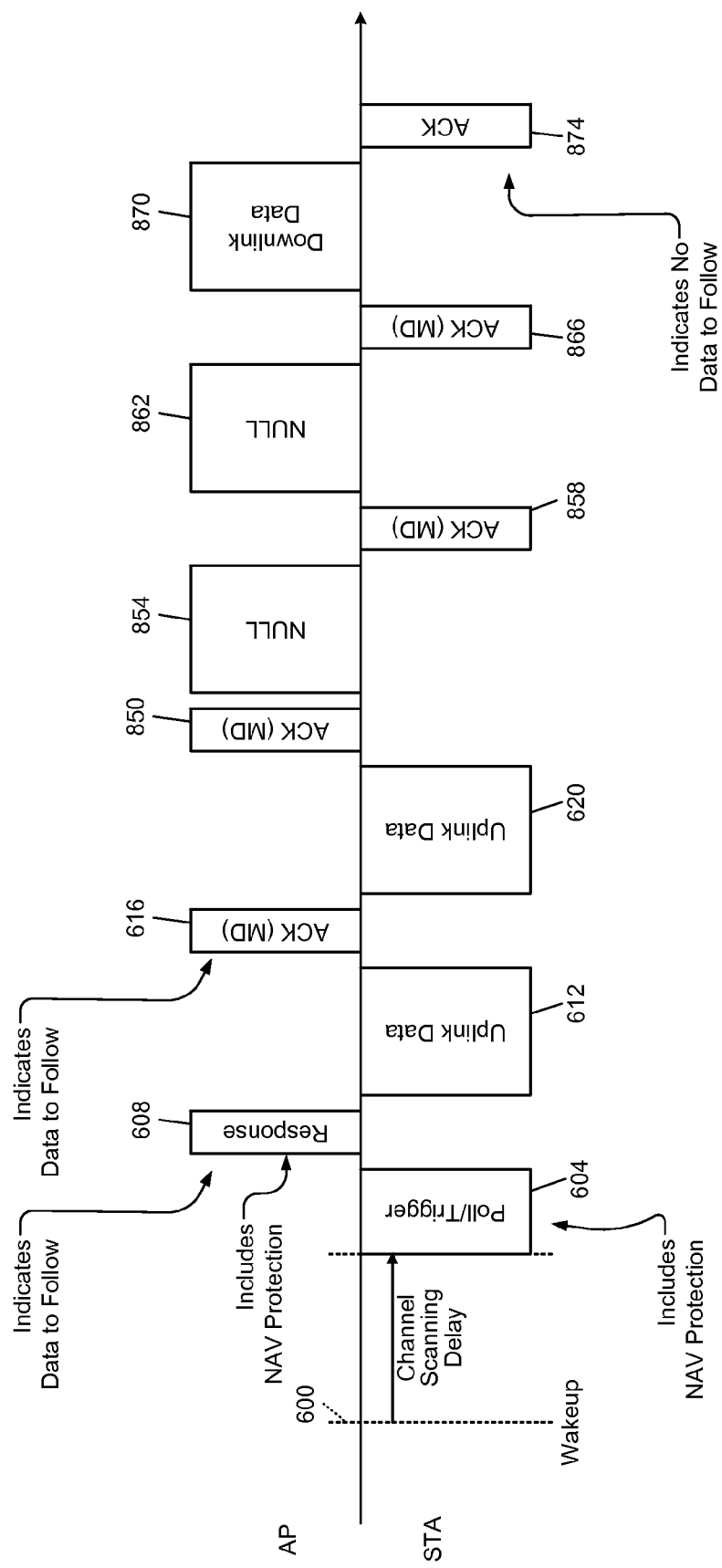
FIG. 10D is an example timeline of an access point sending null data frames to preserve channel access until downlink data is ready.

In FIG. 10D, if the AP is not yet ready with downlink data after the uplink data frame 620, the AP may send an ACK 850 indicating more data. The AP may then send a data frame 854 with null data simply to occupy the channel until the downlink data is ready. The station responds with an ACK 858. If the AP needs additional time, the AP transmits an additional null data packet 862, which is acknowledged with an ACK 866. The AP, now that the downlink data is ready, transmits a downlink data frame 870 to the station, which acknowledges with an ACK 874.

In FIG. 11A, a poll frame based on an NDP (null data packet) frame includes 36 bits. A 4-bit message type indicator is an unused MCS (modulation and coding scheme) field in a normal data packet. A 9-bit transmitter address may include a partial AID, while a 9-bit receiver address may include a partial basic service set identification (BSSID). A 4-bit preferred MCS specifies the preferred set of MCS values to be used in future transmissions. Six tail bits are included for future use and a 4-bit cyclic redundancy check (CRC) is included for error detection.

The poll frame may include indication bits that request data from the AP. For example, the station may request a BSS change sequence, which will indicate current or future differences in various configuration parameters of the BSS. If the station needs to wait past the following beacon in order to receive or transmit, the beacon may provide this data to the station. The station may also request the current timestamp to synchronize the station's clock with that of the AP. Again, if the station will remain awake to receive the following beacon, the AP may not need to further respond to this request.

The poll frame may also indicate that adjacent stations should set NAV2 to a duration based on a maximum PPDU length following the poll frame. The poll frame may also indicate that uplink data is queued for transmission or that the uplink data will be transmitted after a response to the poll frame. The more data indication may be used by surrounding stations to set NAV2 based on a maximum PPDU to protect the channel for following uplink data.

In FIG. 11B, a short MAC header frame used as a poll frame is shown. Following the PHY header are two octets for frame control, which may include a frame type indicating that this is a short poll frame. The frame control octets are followed by two octets for AID, which are followed by six octets for BSSID. Finally, four octets are reserved for forward error correction.

In response to the poll, the AP may transmit a response to the station following a SIFS period. The response may take the form of a downlink data frame, an immediate acknowledgment, or a standalone response frame. The response may include a deferred channel access time, a BSS change sequence, timestamp, a next wakeup or channel access time value, a unicast indication that buffered data is waiting for the station, a group-addressed indication that data is buffered for a group including the station. The group-addressed indication may also include an indication of which group the data belongs to.

A station can transmit a poll frame, also known as a power-saving poll frame (PS-poll frame) upon waking up, at the end of a TXOP, upon finishing the transmission of queued uplink data, etc. The AP may send a response frame (also known as a PS-poll response frame) in response to a poll frame or certain data frames. For example, a data frame with a more data bit set equal to 0 received from a station may solicit transmission of a response frame to that station. In such cases, the response frame can be returned as an acknowledgement to the data frame, aggregated with an acknowledgment of the data frame, or after the acknowledgment frame spaced apart by a time such as SIFS.

The response can use an NDP (null data packet) format, where the SIG field includes frame type, CRC, tail bits, frame ID, an indication of whether there is additional transmission to follow, a first value, and a second value. The first value may indicate a change in BSS parameters, a short timestamp, a channel access delay, or a time delay until the next beacon. The second value may indicate a length of time for the station to defer transmission or may include an instruction for the station to wake up at the next beacon. To reduce the number of bits necessary to encode a duration or timestamp, the AP may preannounce the time resolution or units to be used when designating the duration or timestamp.

In FIG. 11C, another response format is shown, which begins with two octets for frame control. The frame control bits indicate the frame type, the presence of optional fields, and/or special indications like deferral times or next beacon indications. A next beacon indication may instruct the station to wait for the next beacon before transmitting. The FC octets are followed by two AID octets and six BSSID octets. Next a BSS change sequence octet is included, followed by a four octet timestamp and a variable length additional field. Finally, four octets of FEC are included.

In FIG. 11D, a shortened CF-END frame, which cancels a NAV set by a previously transmitted frame, is shown. The CF-END frame may be shortened into an NDP format frame and include two octets of frame control, two octets indicating duration, six octets as a receiver address, six octets as a transmitter address (in this case, BSSID), and four octets for a frame check sequence. Alternatively, a short CTS-to-self frame with a duration of zero can be used to cancel the NAV set in adjacent stations.

Figure 12B:
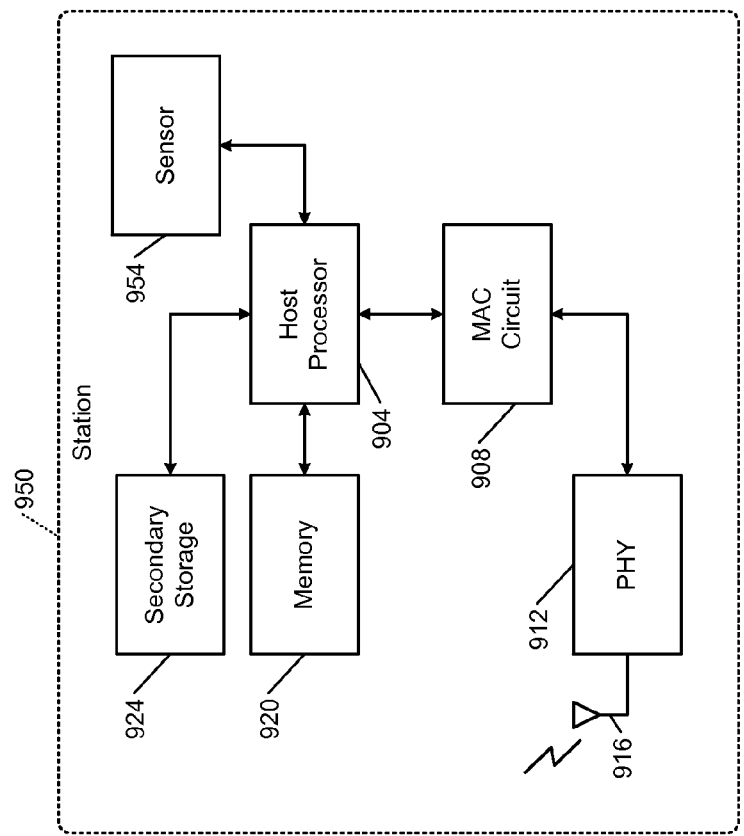
FIG. 12B is a block diagram of an example implementation of a station.
Figure 12A:
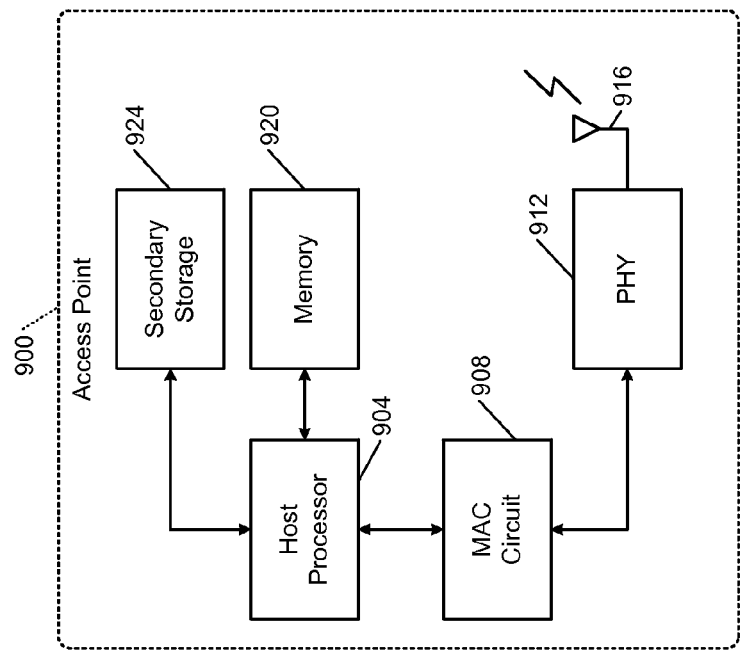
FIG. 12A is a block diagram of an example implementation of an access point.

In FIG. 12A, an example access point 900 includes a host processor 904, which provides data to and receives data from a medium access control (MAC) circuit 908. The MAC circuit 908 interfaces with a wireless medium via a physical layer device (PHY) 912 and an antenna 916. The host processor 904 may store data, such as cached frames for stations in the BSS of the access point 900 in a memory 920.

Secondary storage 924 may include instructions, parameters, and firmware for execution by the host processor 904. In addition, secondary storage 924 may back up the memory 920, which may be volatile. In addition, when a large amount of data is cached, some of that data may be stored to the secondary storage 924. This may increase the amount of time needed to access that data before that data can be transmitted, such as is shown in FIGS. 10A-10D.

In FIG. 12B, an example station 950 includes components that may be similar to the access point 900 of FIG. 12A. In addition, one or more sensors, such as a sensor 954, provide measurements to the host processor 904. These measurements may be included in uplink data sent to the access point 900.

Figure 13:
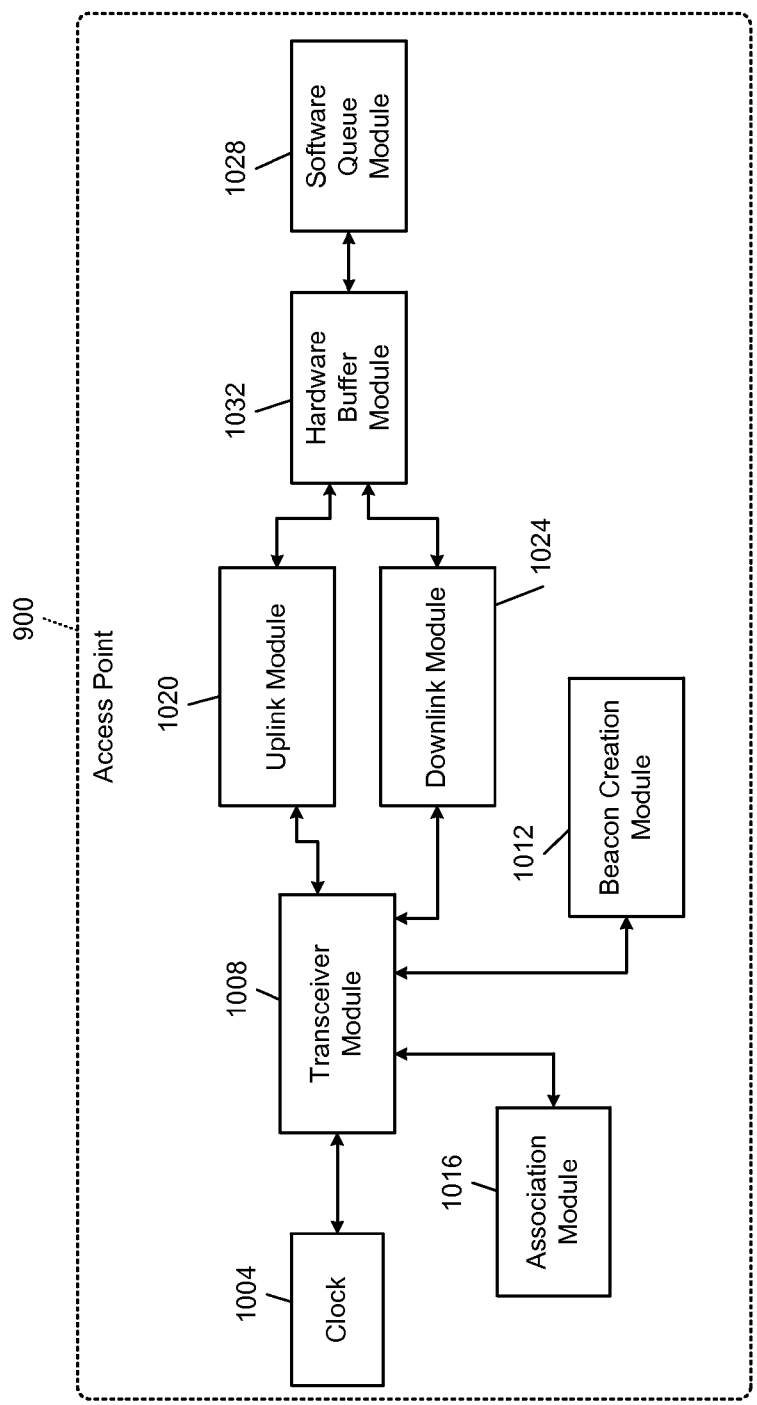
FIG. 13 is a functional block diagram of an example implementation of an access point.

In FIG. 13, selected functional blocks from an example implementation of the access point 900 are shown. A clock 1004 provides timing for elements of the BSS controlled by the access point 900. The clock 1004, for example, determines when the target beacon transmission time (TBTT) is, and therefore determines timing of beacons. A transceiver module 1008 transmits and receives data wirelessly to and from wireless stations in the BSS. For example, the transceiver module 1008 transmits beacons from a beacon creation module 1012.

The beacon creation module 1012 determines whether a restricted access window should be used and determines whether a blackout window should be used. The beacon creation module 1012 may also determine parameters corresponding to the restricted access window and the blackout window, such as start times and durations.

An association module 1016 tracks which stations are associated with the access point 900 and determines and records parameters related to the stations, such as assigned wakeup times for power-saving stations. An uplink module 1020 receives frames transmitted by stations in the BSS to the access point 900. A downlink module 1024 tracks and transmits downlink data from the access point 900 to stations of the BSS.

The downlink module 1024 may buffer frames from a software queue module 1028 into a hardware buffer module 1032. Frames stored in the hardware buffer module 1032 may be available for rapid transmission to power-saving stations that wake up intermittently and request downlink data. The uplink module 1020 may store received frames in the software queue module 1028 and/or the hardware buffer module 1032 before forwarding on the uplink frames, such as to a wired networking port (not shown) of the access point 900.

Figure 14:
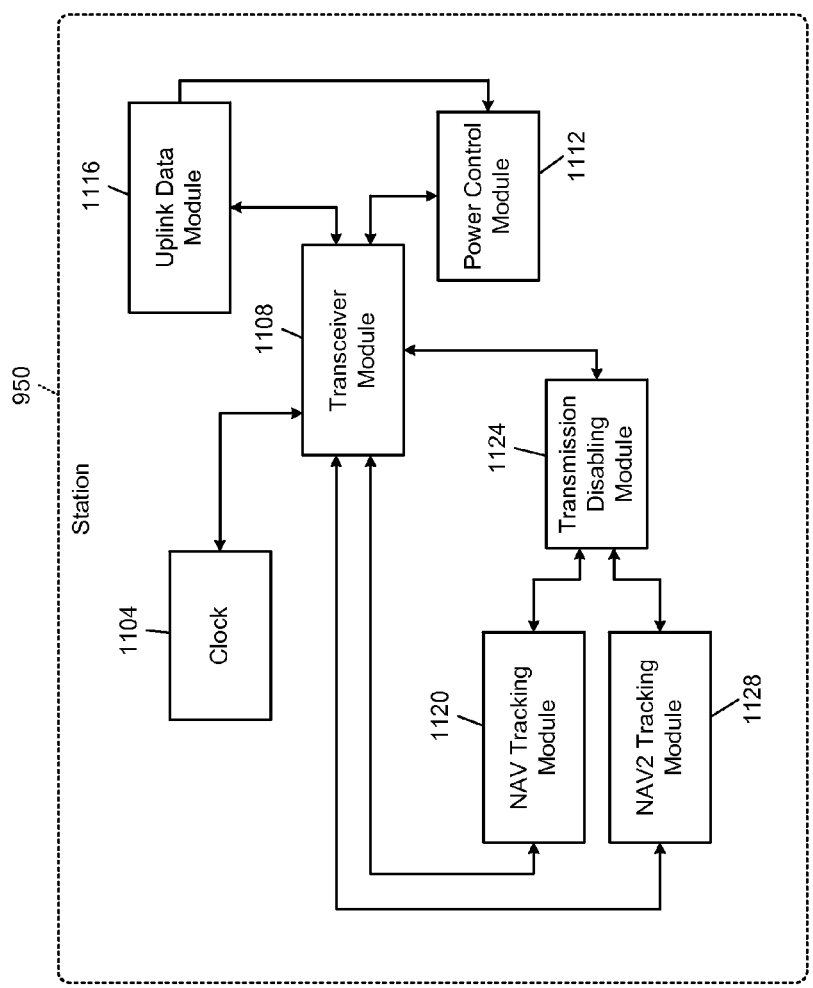
FIG. 14 is a functional block diagram of an example implementation of a station.

In FIG. 14, selected functional blocks of an example implementation of the station 950 are shown. A clock 1104 synchronizes to the clock 1004 of the access point 900 when the station 950 receives a beacon from the access point 900 or receives another frame that includes a timestamp. A transceiver module 1108 wirelessly transmits data to the access point 900 and wirelessly receives data from the access point 900.

A power control module 1112 determines when the station 950 should enter into a sleep mode. In the sleep mode, various aspects of the station 950 may be turned off, including various circuitry of the transceiver module 1108. For example only, during the sleep mode, the transceiver module 1108 may not be able to transmit or receive data or even determine whether the wireless medium is free.

The power control module 1112 may keep track of transmission timeslots assigned by the access point 900. For example, the power control module 1112 may track the assigned wakeup time so that the transceiver module 1108 can power up and transmit data during an appropriate time that is not within a blackout window.

Because the clock 1104 is not synchronized with the access point 900 while the station 950 is in the sleep mode, small differences in clock frequency between the clock 1104 and the access point 900 create clock drift. After a long enough time of not being synchronized, the clock 1104 may possibly be so far out of sync with the clock 1004 of the access point 900 that the transceiver module 1108 is unable to transmit during a known window in the beacon interval. As a result, after waking from a sleep mode, the transceiver module 1108 may wait to receive a beacon frame or other frame containing timestamp information to reestablish synchronization of the clock 1104.

An uplink data module 1116 queues data for uplinking to the access point 900. For example only, measured data from one or more sensors may be included as part of the uplinked data. The uplink data module 1116 provides data frames to the transceiver module 1108 for transmission, and may also indicate the presence of uplink data to the power control module 1112. This indication of pending data may trigger the power control module 1112 to exit the station 950 from sleep mode in time for the next transmission interval.

A network allocation vector (NAV) tracking module 1120 observes frames received by the transceiver module 1108 that are not addressed to the station 950 in order to track availability of the channel (or, wireless medium). A frame that includes a non-zero duration field indicates that a NAV counter of the NAV tracking module 1120 should be set. The duration field indicates how long an upcoming transmission is expected to take, and the NAV tracking module 1120 indicates to a transmission disabling module 1124 that the transceiver module 1108 should not attempt to acquire channel access and begin transmitting until the period specified by the duration has expired.

In various implementations, the NAV tracking module 1120 may implement a counter that is set to a non-zero value based on the duration and that counts down to zero. Once the NAV tracking module 1120 counts down to zero, the transmission disabling module 1124 allows the transceiver module 1108 to acquire channel access and begin transmission.

A second tracking module (referred to as NAV2 tracking module) 1128 monitors frames that the transceiver module 1108 receives but are not addressed to the station 950. When the NAV2 tracking module 1128 observes a data frame, an acknowledgment frame is expected to follow, and therefore the NAV2 tracking module 1128 monitors a time period based on the length of an acknowledgment frame. The NAV2 tracking module 1128 may monitor the time period using a channel access counter that decrements toward zero starting at a counter value that is based on the time period to monitor. Equivalently, the channel access counter may increment from zero toward the counter value.

Specifically, as shown in FIG. 9, the length of time may be equal to a sum of a predefined short interframe space (SIFS) and a length of time required to transmit an acknowledgment frame. When the NAV2 tracking module 1128 observes an acknowledgment frame, the NAV2 tracking module 1128 may determine whether an additional data frame is expected after the acknowledgment frame.

For example, a following data frame may be indicated by a more data indication in the acknowledgement frame. For example only, the more data indication may be a binary signal with an active value indicating that more data will follow and an inactive value indicating that no more data is to follow. If the NAV2 tracking module 1128 determines that an additional data frame is expected, the NAV2 tracking module 1128 tracks a time period needed for the following data frame to be sent. Specifically, the time period may be equal to a sum of SIFS and a transmission time for a maximum PPDU.

While the NAV2 tracking module 1128 is tracking a time period after a data frame has been sent, the NAV2 tracking module 1128 may abruptly and prematurely expire the time period in response to observing the expected acknowledgment having been sent. Similarly, when the NAV2 tracking module 1128 is tracking a time period in response to an acknowledgment frame, the NAV2 tracking module 1128 abruptly and prematurely expires the time period once the expected data frame is observed.

The transmission disabling module 1124 prevents the transceiver module 1108 from transmitting data when either the counter of the NAV tracking module 1120 is non-zero or the time period of the NAV2 tracking module 1128 is unexpired. In various implementations, the NAV2 tracking module 1128 may track the time period using a counter that decrements toward zero from a non-zero value determined based on the time period. Once the counter reaches zero, the time period is considered to have expired. In order to prematurely expire the time period, the NAV2 tracking module 1128 may directly set the counter to zero.

Figure 15:
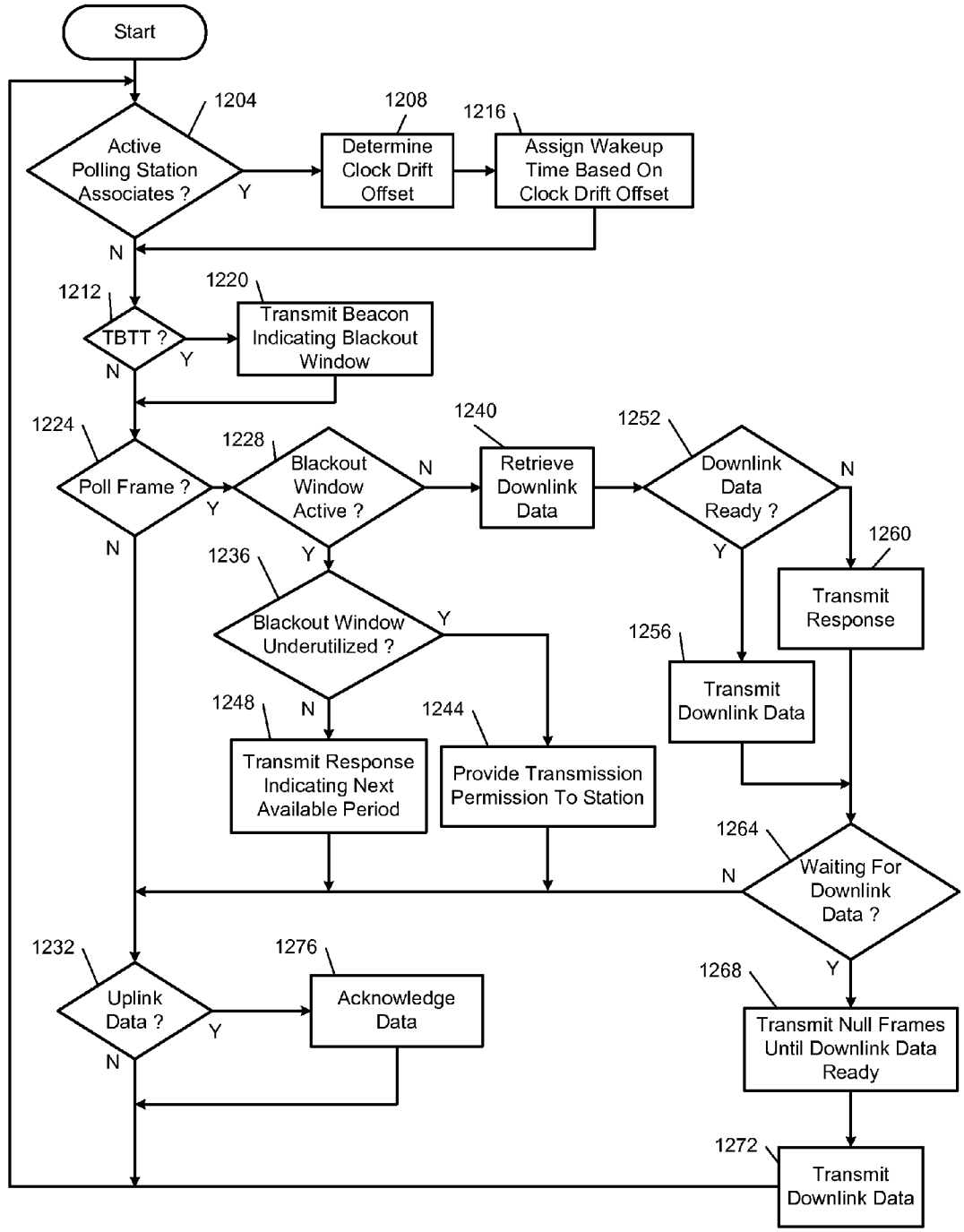
FIG. 15 is a flowchart of example operation of an access point.

In FIG. 15, example control of an access point begins at 1204 where, if an active polling station is associating with the access point, control transfers to 1208; otherwise, control transfers to 1212. At 1208, control determines a clock drift offset for the station. The clock drift offset may be determined based on an accuracy of the clock of the station combined with a maximum time between wakeup events of the station.

Control continues at 1216, where control assigns a wakeup time to the station based on the clock drift offset. For example, the wakeup time may be separated from a blackout window by at least the clock drift offset. Control then continues at 1212. At 1212, if a target beacon transmission time has been reached, control transfers to 1220; otherwise, control continues at 1224.

At 1220, control transmits a beacon indicating (or, advertising) one or more of a blackout window or restricted access window. The beacon may indicate beginning and ending or duration times for each of the indicated windows. Control then continues at 1224. At 1224, control determines whether a poll frame has been received. If so, control transfers to 1228; otherwise, control transfers to 1232. At 1228, if a blackout window is currently active, control transfers to 1236; otherwise, control transfers to 1240.

At 1236, control determines whether the blackout window is underutilized. If so, control transfers to 1244; otherwise, control transfers to 1248. The blackout window may be underutilized when few stations have been assigned to the blackout window or when stations assigned to the blackout window have already finished their data exchanges. At 1244, because the blackout window is determined to be underutilized, control may signal permission to transmit to the station. Control then continues at 1232. At 1248, the blackout window is being used and therefore the access point transmits a response to the station indicating the next available period for transmission. For example, the next available period may be the next open access window or may be the assigned timeslot within a restricted access window. Control then continues at 1332.

At 1240, control retrieves any downlink data that is queued for the station. Control continues at 1252, where if there is downlink data ready for the station, control transfers to 1256; otherwise, control transfers to 1260. At 1256, control transmits downlink data to the station and continues at 1264. At 1260, downlink data is not ready and therefore a response is transmitted to the station. The response may indicate that no downlink data is present or may indicate that downlink data is being retrieved. The response may also include, as discussed above, information about when the station should expect to receive the downlink data.

Control then continues at 1264. At 1264, if the access point is waiting for downlink data to be ready, control transfers to 1268; otherwise, control transfers to the 1232. At 1268, control transmits null frames to the station until the downlink data is ready. This preserves access to the channel and prevents other stations from contending for access and preventing prompt transmission of the downlink data. Control continues at 1272, where the downlink data is transmitted, and control returns to 1204. At 1232, control determines whether uplink data is being received from the station. If so, control acknowledges that data at 1276. In either case, control then returns to 1204.

Figure 16A:
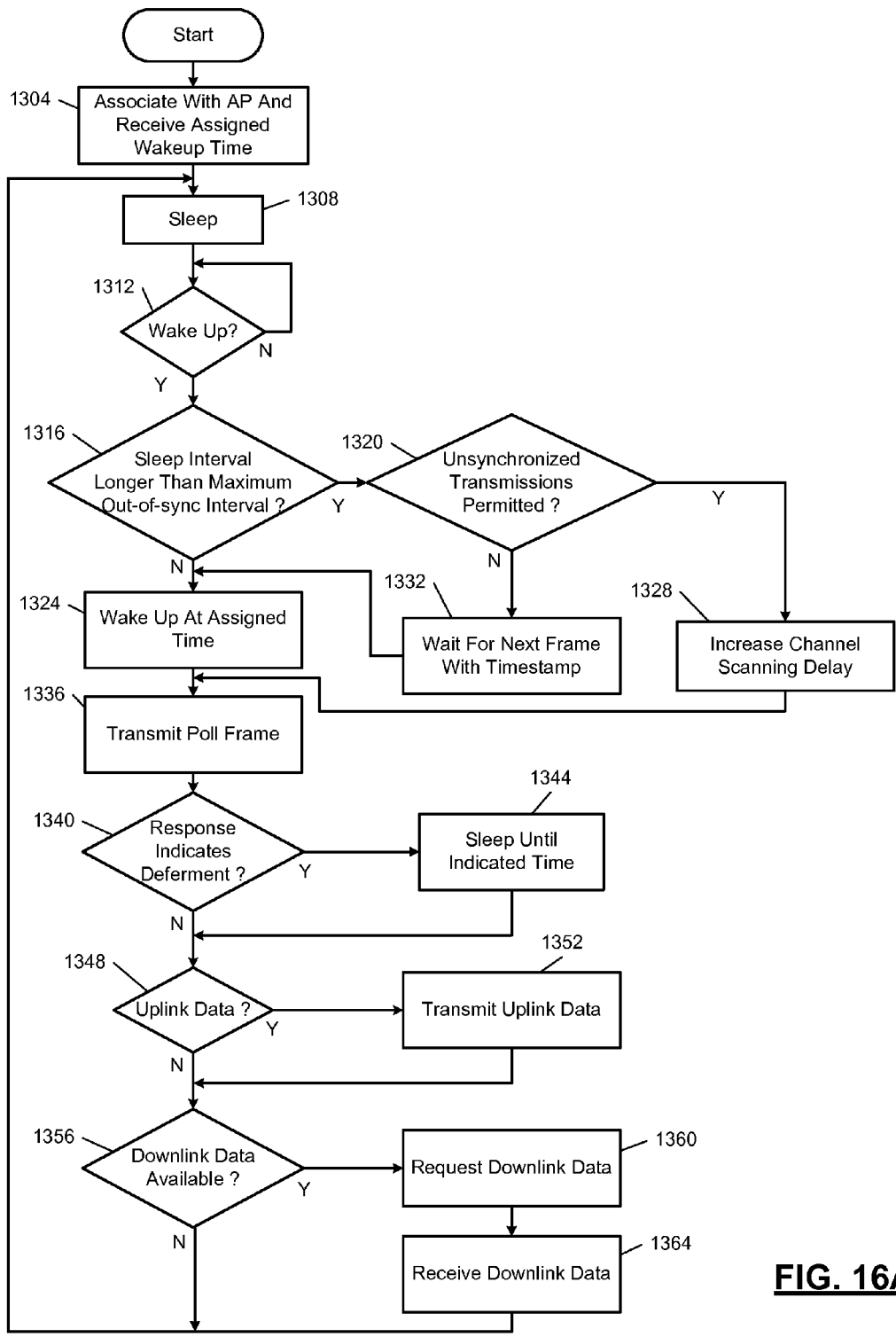
FIG. 16A is a flowchart of example operation of a station.

In FIG. 16A, example control of the station begins at 1304, where the station associates with an access point. As part of the association, the station may receive an assigned wakeup time at which the station can transmit after exiting from a sleep mode. At 1308, assuming that there is no uplink data to transmit or downlink data to receive, control enters a sleep mode. Control continues at 1312, where control remains until a decision is made to wake up. Control may determine to wake up when uplink data is ready for transmission to the access point. In various implementations, control may wait to wake up until a predetermined amount of data is ready for transmission to minimize the number of wakeup events.

Once control determines at 1312 to wake up, control continues at 1316, where control determines whether the interval during which the station has been asleep is longer than the maximum of out-of-sync interval. If the sleep interval is longer, control transfer to 1320; otherwise, control transfers to 1324. At 1320, because the sleep interval is longer than the maximum out-of-sync interval, there is no guarantee that when the station wakes up and attempts to transmit, that the transmission will not coincide with a blackout window.

If the BSS permits unsynchronized transmissions, control transfers to 1328, where restrictions on the unsynchronized transmissions may be imposed. For example, the channel scanning delay may be increased. The channel scanning delay may mean that the station is less likely to acquire the channel than other stations that are supposed to be accessing the channel at the time. Control then continues at 1336.

If, at 1320, unsynchronized transmissions are not permitted, control transfers to 1332 to wait for the next frame that includes a timestamp, which will allow the station's clock to be synchronized to the BSS. For example only, a beacon may be the next frame that includes a timestamp. Control then continues at 1324. At 1324, control wakes up at the assigned time as determined by the clock of the station. Because of clock offset, the actual wakeup time may be different than the expected wakeup time according to the master clock at the access point.

Control then continues at 1336, where a poll frame is transmitted to the access point. At 1340, control whether a response received from the access point indicates deferment, such as when the poll frame has been transmitted during a blackout window. If so, control transfers to 1344; otherwise, control transfers to 1348. At 1344, control recognizes that uplink and/or downlink data may need to wait until the time indicated in the response. Control may therefore re-enter a sleep mode until just before the deferred time. Control continues at 1348.

At 1348, control determines whether there is uplink data for transmission to the access point. If so, control transfers to 1352; otherwise, control transfers to 1356. At 1352, control transmits uplink data to the access point and continues at 1356. At 1356, control determines whether downlink data is available and, if so, transfers to 1360. Otherwise, control returns to 1308. At 1360, control requests the downlink data and at 1364, control receives the downlink data. Control then returns to 1308.

Figure 16B:
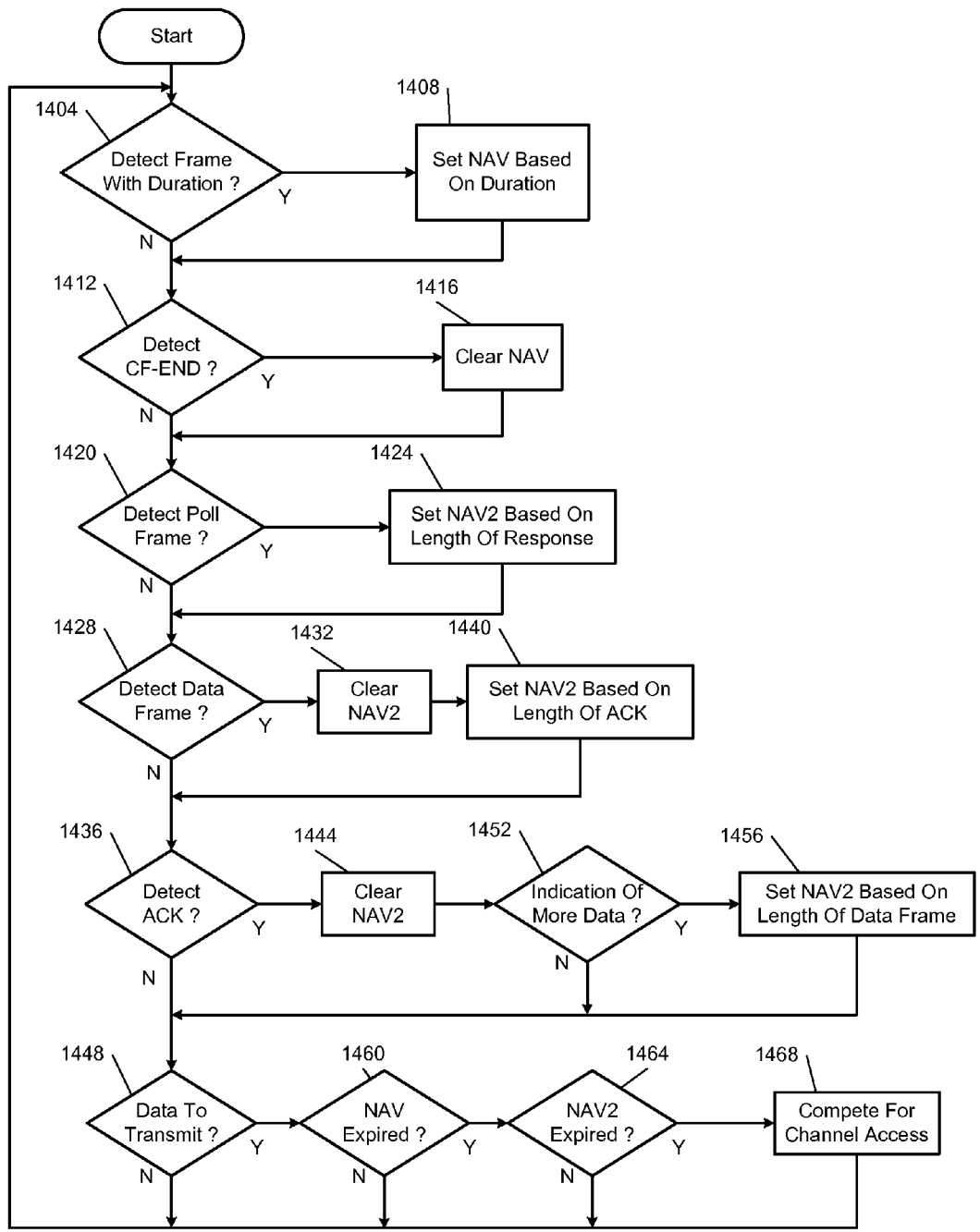
FIG. 16B is a flowchart of example operation of a station in relation to a channel access protection mechanism.

In FIG. 16B, example control for a station implementing channel access protection begins at 1404. At 1404, control determines whether a frame not addressed to the station has been detected with a duration field set to a non-zero value. If so, control transfers to 1408; otherwise, control transfers to 1412. At

1408, control sets a network allocation vector based on the duration and continues at 1412. At 1412, if control has detected a CF-END frame, control transfers to 1416; otherwise, control transfers to 1420. At 1416, control clears the NAV (e.g., sets the NAV to zero) and continues at 1420.

At 1420, if control detects a poll frame directed from another station to the access point, control transfers to 1424; otherwise, control transfers to 1428. At 1424, control sets a second counter (referred to as NAV2) based on a predetermined time for how long a response to the poll frame will take to transmit. Control then continues at 1428.

At 1428, if a data frame not addressed to the station has been detected, control transfers to 1432. Otherwise, control transfers to 1436. At 1432, control clears the NAV2 that was set by a preceding acknowledgment frame and continues at 1440. At 1440, control sets a new NAV2 based on a predetermined time that an acknowledgment frame takes to transmit. Control then continues at 1436.

At 1436, if an acknowledgment frame not addressed to the station has been detected, control transfers to 1444; otherwise, control transfers to 1448. At 1444, control clears a NAV2 set by the preceding data frame and continues at 1452. At 1452, if there is an indication in the detected acknowledgment of more data, control transfers to 1456; otherwise, control continues at 1448. At 1456, control sets the NAV2 based on the expected transmission time of the data frame. For example, this may be a maximum PPDU length. Control then continues at 1448.

At 1448, control determines whether there is data to transmit. If so, control transfers to 1460. At 1460, if the NAV has expired (i.e., if the counter has reached zero), control transfers to 1464; otherwise, control returns to 1404. At 1464, control determines whether the NAV2 time period has expired, and if so, control transfers to 1468; otherwise, control returns to 1404. At 1468, control competes for channel access to begin transmission. Control then returns to 1404.

The wireless communications described in the present disclosure can be conducted in full or partial compliance with IEEE standard 802.11-2012. In various implementations, IEEE standard 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

Further aspects of the present disclosure relate to one or more of the following clauses. A wireless station includes a transceiver configured to wirelessly receive networking frames over a wireless medium, and a channel access counter configured to track a time period and signal that the time period has expired. The time period begins in response to a first networking frame of the networking frames. The first networking frame is addressed to a receiver other than the wireless station. A length of the time period is based on a first length in response to a type of the first networking frame being an acknowledgment frame type. The length of the time period is based on a second length in response to the type of the first networking frame being a data frame type. The transceiver is configured to wait to access the wireless medium until after the channel access counter signals that the time period has expired.

In other features, the first length is longer than the second length. In other features, the first length is based on a transmission time of a maximum length data frame. In other features, the length of the time period corresponding to the acknowledgement frame type is based on a sum of a short interframe space (SIFS) and the transmission time, and the maximum length data frame is a maximum length physical layer convergence procedure (PLCP) protocol data unit (PPDU) frame. In other features, the length of the time period corresponding to the data frame type is based on a predetermined transmission time for an acknowledgement frame. In other features, the length of the time period corresponding to the data frame type is based on a sum of a short interframe space (SIFS) and the predetermined transmission time for the acknowledgement frame.

In other features, the channel access counter includes a counter configured to count down to zero. In other features, the channel access counter is configured to signal that the time period has expired when the counter reaches zero. In other features, the channel access counter is configured to selectively signal that the time period has expired in response to the transceiver receiving, during the time period, a second networking frame. In other features, the channel access counter is configured to signal that the time period has expired in response to (i) the type of the first networking frame being the data frame type and (ii) a type of the second networking frame being the acknowledgement frame type. In other features, the channel access counter is configured to signal that the time period has expired in response to (i) the type of the first networking frame being the acknowledgement frame type and (ii) a type of the second networking frame being the data frame type.

In other features, the channel access counter is configured to omit tracking the time period in response to the type of the first networking frame being the acknowledgement frame type and a more data indication within the first networking frame indicating that more data is not expected. In other features, the wireless station includes a network allocation vector counter configured to count down to zero The network allocation vector counter is set to a value based on a duration field in the first networking frame. The transceiver is configured to wait to access the wireless medium until after the network allocation vector counter reaches zero. In other features, the network allocation vector counter is configured to change directly to zero in response to the transceiver receiving a contention-free end (CF-END) frame.

A wireless access point includes a beacon creation module, an association module, and a transceiver. The beacon creation module is configured to create a beacon that defines a restricted access window and a blackout window. A time period of the restricted access window is mutually exclusive with a time period of the blackout window. The association module is configured to, in the beacon, assign a slot in the restricted access window to a wireless station. The association module is configured to select the slot so that the slot is spaced apart from the time period of the blackout window by at least a clock drift offset. The clock drift offset is determined based on a maximum sleep period for the wireless station. The transceiver is configured to wirelessly transmit the beacon.

In other features, the beacon defines an open access window occupying a time period that is mutually exclusive with the time period of the restricted access window and the time period of the blackout window. In other features, a combined length of the time period of the open access window, the time period of the restricted access window, and the time period of the blackout window is an entire interval between consecutive beacons. In other features, the beacon instructs the wireless station that, in response to sleeping for longer than the maximum sleep period, the wireless station is required to transmit a short polling frame prior to transmitting data. In other features, the beacon instructs the wireless station that, in response to sleeping for longer than the maximum sleep period, the wireless station is required to wait for a timestamp prior to transmitting data.

In other features, the timestamp is included in a beacon transmitted following the wireless station waking up. In other features, the transceiver is configured to, in response to receiving a frame from an active polling station during the blackout window, instruct the active polling station to defer communication. In other features, the transceiver is configured to instruct the active polling station to defer communication until a next beacon. In other features, the transceiver is configured to instruct the active polling station to defer communication until an open access window. The beacon defines the open access window to occupy a time period that is mutually exclusive with the time period of the restricted access window and the time period of the blackout window.

A method of operating a wireless station includes wirelessly receiving networking frames over a wireless medium, and tracking a time period. The time period begins in response to a first networking frame of the networking frames. The first networking frame is addressed to a receiver other than the wireless station. A length of the time period is based on a first length in response to a type of the first networking frame being an acknowledgment frame type. The length of the time period is based on a second length in response to the type of the first networking frame being a data frame type. The method also includes generating an expiration signal in response to the time period expiring. The method also includes waiting to access the wireless medium until the expiration signal has been generated.

In further features, the first length is longer than the second length. In other features, the first length is based on a transmission time of a maximum length data frame. In other features, the first length is based on a sum of a short interframe space (SIFS) and the transmission time, and the maximum length data frame is a maximum length physical layer convergence procedure (PLCP) protocol data unit (PPDU) frame. In other features, the first length is based on a predetermined transmission time for an acknowledgement frame. In other features, the second length is based on a sum of a short interframe space (SIFS) and the predetermined transmission time for the acknowledgement frame.

In further features, the tracking the time period includes decrementing a counter to zero starting from a value based on the time period. The generating the expiration signal is performed in response to the counter reaching zero. In other features, the method includes selectively generating the expiration signal in response to receiving, during the time period, a second networking frame. The selectively generating the expiration signal includes generating the expiration signal in response to (i) the type of the first networking frame being the data frame type and (ii) a type of the second networking frame being the acknowledgement frame type. In other features, the selectively generating the expiration signal includes generating the expiration signal in response to (i) the type of the first networking frame being the acknowledgement frame type and (ii) a type of the second networking frame being the data frame type.

In further features, the method includes, in response to the type of the first networking frame being the acknowledgement frame type and a more data indication within the first networking frame indicating that more data is not expected, omitting tracking the time period. In other features, the method includes decrementing a network allocation vector counter to zero from a value based on a duration field in the first networking frame, and waiting to access the wireless medium until after the network allocation vector counter reaches zero. In other features, the method includes decreasing the network allocation vector counter directly to zero in response to receiving a contention-free end (CF-END) frame.

A method of operating a wireless access point includes creating a beacon that defines a restricted access window and a blackout window. A time period of the restricted access window is mutually exclusive with a time period of the blackout window. The method also includes determining a clock drift offset for a wireless station based on a maximum sleep period for the wireless station. The method also includes selecting a slot in the restricted access window for the wireless station so that the slot is spaced apart from the time period of the blackout window by at least the clock drift offset. The method also includes assigning the slot to the wireless station in the beacon, and wirelessly transmitting the beacon.

In other features, the method includes configuring the beacon to define an open access window occupying a time period that is mutually exclusive with the time period of the restricted access window and the time period of the blackout window. A combined length of the time period of the open access window, the time period of the restricted access window, and the time period of the blackout window is an entire interval between consecutive beacons. In other features, the method includes configuring the beacon to instruct the wireless station that, in response to sleeping for longer than the maximum sleep period, the wireless station is required to transmit a short polling frame prior to transmitting data. In other features, the method includes configuring the beacon to instruct the wireless station that, in response to sleeping for longer than the maximum sleep period, the wireless station is required to wait to receive a timestamp prior to transmitting data. The timestamp is included in a beacon transmitted following the wireless station waking up.

In other features, the method includes, in response to receiving a frame from an active polling station during the blackout window, instructing the active polling station to defer communication. The instructing the active polling station to defer communication includes instructing the active polling station to defer communication until a next beacon. In other features, instructing the active polling station to defer communication includes instructing the active polling station to defer communication until an open access window. In other features, the method includes configuring the beacon to define the open access window to occupy a time period that is mutually exclusive with the time period of the restricted access window and the time period of the blackout window.

What is claimed is:

1. A wireless device comprising:
   a transceiver configured to wirelessly receive networking frames over a wireless medium; and
   a channel access counter configured to (i) track a time period and (ii) signal that the time period has expired, wherein
      the transceiver is configured to wait to access the wireless medium until after the channel access counter signals that the time period has expired,
      the channel access counter is configured to begin the time period in response to a first networking frame of the networking frames being received by the transceiver,
      the first networking frame is addressed to a receiver,
      the channel access counter is configured to set a length of the time period based on a first length value in response to a type of the first networking frame being an acknowledgment frame type,
      the first length value is a predetermined value that is equal to a sum of a short interframe space (SIFS) and a transmission time of a maximum length physical layer convergence procedure protocol data unit frame,
      the channel access counter is configured to set the length of the time period based on a second length value in response to the type of the first networking frame being a data frame type,
      the second length value is a predetermined value that is equal to a sum of the SIFS and a predetermined transmission time for an acknowledgement frame, and
      the channel access counter is configured to selectively signal that the time period has expired in response to the transceiver receiving, during the time period, a second networking frame of the networking frames.

2. The wireless device of claim 1, wherein the first length value is longer than the second length value.

3. The wireless device of claim 1, wherein the channel access counter comprises a counter configured to count down to zero.

4. The wireless device of claim 3, wherein the channel access counter is configured to signal that the time period has expired when the counter reaches zero.

5. The wireless device of claim 1, wherein the channel access counter is configured to signal that the time period has expired in response to (i) the type of the first networking frame being the data frame type in combination with (ii) a type of the second networking frame being the acknowledgement frame type.

6. The wireless device of claim 1, wherein the channel access counter is configured to signal that the time period has expired in response to (i) the type of the first networking frame being the acknowledgement frame type in combination with (ii) a type of the second networking frame being the data frame type.

7. The wireless device of claim 1, wherein the channel access counter is configured to omit tracking the time period in response to the type of the first networking frame being the acknowledgement frame type and a more data indication within the first networking frame indicating that more data is not expected.

8. The wireless device of claim 1, further comprising a network allocation vector counter configured to count down to zero, wherein the network allocation vector counter is set to a value based on a duration field in the first networking frame, and wherein the transceiver is configured to wait to access the wireless medium until after the network allocation vector counter reaches zero.

9. The wireless device of claim 8, wherein the network allocation vector counter is configured to change directly to zero in response to the transceiver receiving a contention-free end (CF-END) frame.

10. A method of operating a wireless device, the method comprising:
    wirelessly receiving networking frames over a wireless medium;
    tracking a time period, including
       beginning the time period in response to a first networking frame of the networking frames being received, wherein the first networking frame is addressed to a receiver;
       setting a length of the time period based on a first length value in response to a type of the first networking frame being an acknowledgment frame type, wherein the first length value is a predetermined value that is equal to a sum of a short interframe space (SIFS) and a transmission time of a maximum length physical layer convergence procedure protocol data unit frame; and
       setting the length of the time period based on a second length value in response to the type of the first networking frame being a data frame type, wherein the second length value is a predetermined value that is equal to a sum of the SIFS and a predetermined transmission time for an acknowledgement frame;
    generating an expiration signal in response to the time period expiring;
    selectively generating the expiration signal in response to receiving, during the time period, a second networking frame; and
    waiting to access the wireless medium until the expiration signal has been generated.

11. The method of claim 10, wherein the first length value is longer than the second length value.

12. The method of claim 10, wherein the tracking the time period includes decrementing a counter to zero starting from a value based on the time period.

13. The method of claim 12, wherein the generating the expiration signal is performed in response to the counter reaching zero.

14. The method of claim 10, wherein the selectively generating the expiration signal comprises generating the expiration signal in response to (i) the type of the first networking frame being the data frame type in combination with (ii) a type of the second networking frame being the acknowledgement frame type.

15. The method of claim 10, wherein the selectively generating the expiration signal comprises generating the expiration signal in response to (i) the type of the first networking frame being the acknowledgement frame type in combination with (ii) a type of the second networking frame being the data frame type.

16. The method of claim 10, further comprising, in response to the type of the first networking frame being the acknowledgement frame type and a more data indication within the first networking frame indicating that more data is not expected, omitting tracking the time period.

17. The method of claim 10, further comprising:
  decrementing a network allocation vector counter to zero from a value based on a duration field in the first networking frame; and
  waiting to access the wireless medium until after the network allocation vector counter reaches zero.

18. The method of claim 17, further comprising decreasing the network allocation vector counter directly to zero in response to receiving a contention-free end (CF-END) frame.

19. The wireless device of claim 1, wherein:
  the channel access counter is configured to set the length of the time period equal to the first length value in response to the type of the first networking frame being the acknowledgment frame type; and
  the channel access counter is configured to set the length of the time period equal to the second length value in response to the type of the first networking frame being the data frame type.

20. The method of claim 10, wherein:
  the setting the length of the time period based on the first length value comprises setting the length of the time period equal to the first length value; and
  the setting the length of the time period based on the second length value comprises setting the length of the time period equal to the second length value.

* * * * *